United States Patent
Takaki et al.

(10) Patent No.: US 11,047,315 B2
(45) Date of Patent: Jun. 29, 2021

(54) CONTROL DEVICE FOR GAS TURBINE AND CONTROL METHOD FOR GAS TURBINE

(71) Applicant: Mitsubishi Hitachi Power Systems, Ltd., Kanagawa (JP)

(72) Inventors: Kazushige Takaki, Tokyo (JP); Akihiko Saito, Tokyo (JP); Ryuji Takenaka, Kanagawa (JP); Yoshifumi Iwasaki, Kanagawa (JP); Shinichi Yoshioka, Kanagawa (JP); Tatsuji Takahashi, Kanagawa (JP); Tomohide Akiyama, Kanagawa (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 387 days.

(21) Appl. No.: 16/081,246

(22) PCT Filed: Dec. 9, 2016

(86) PCT No.: PCT/JP2016/086791
§ 371 (c)(1),
(2) Date: Aug. 30, 2018

(87) PCT Pub. No.: WO2017/154300
PCT Pub. Date: Sep. 14, 2017

(65) Prior Publication Data
US 2019/0063335 A1 Feb. 28, 2019

(30) Foreign Application Priority Data
Mar. 9, 2016 (JP) ............... JP2016-045985

(51) Int. Cl.
*F02C 9/28* (2006.01)
*F02C 9/20* (2006.01)
(Continued)

(52) U.S. Cl.
CPC ............. *F02C 9/28* (2013.01); *F01D 15/10* (2013.01); *F02C 9/00* (2013.01); *F02C 9/20* (2013.01);
(Continued)

(58) Field of Classification Search
CPC .................... F02C 9/48; F02C 9/54
See application file for complete search history.

(56) References Cited

U.S. PATENT DOCUMENTS

| 7,698,897 B2 | 4/2010 | Rowe et al. |
| 2007/0079593 A1 | 4/2007 | Fujii et al. |
| 2007/0089395 A1* | 4/2007 | Fujii ............... F02C 9/28 60/39.281 |
| 2007/0271024 A1 | 11/2007 | Fujii et al. |

(Continued)

FOREIGN PATENT DOCUMENTS

| CN | 1932265 | 3/2007 |
| CN | 101079199 | 11/2007 |

(Continued)

OTHER PUBLICATIONS

International Search Report dated Mar. 14, 2017 in International (PCT) Application No. PCT/JP2016/086791.

(Continued)

Primary Examiner — Gerald L Sung
Assistant Examiner — William L Breazeal
(74) Attorney, Agent, or Firm — Wenderoth, Lind & Ponack, L.L.P.

(57) ABSTRACT

A gas turbine control device includes a detection value acquisition unit that acquires a detection value of at least one of a supply amount of fuel, pressure of compressed air, and electric power generated by a generator; a flue gas temperature acquisition unit that acquires a flue gas temperature detection value; a combustion gas temperature estimate value calculation unit that calculates a combustion gas temperature estimate value based on the detection value; a correction term acquisition unit that calculates a correction (Continued)

term based on a ratio between the combustion gas temperature estimate value and the flue gas temperature detection value; a corrected combustion gas temperature estimate value calculation unit that corrects the combustion gas temperature estimate value using the correction term to calculate a corrected combustion gas temperature estimate value; and a gas turbine controller that controls the gas turbine based on the corrected combustion gas temperature estimate value.

8 Claims, 10 Drawing Sheets

(51) Int. Cl.
*F02C 9/00* (2006.01)
*F02C 9/54* (2006.01)
*F01D 15/10* (2006.01)

(52) U.S. Cl.
CPC ............ *F02C 9/54* (2013.01); *F05D 2220/32* (2013.01); *F05D 2240/35* (2013.01); *F05D 2260/20* (2013.01); *F05D 2260/80* (2013.01); *F05D 2270/0831* (2013.01); *F05D 2270/112* (2013.01); *F05D 2270/303* (2013.01); *F05D 2270/3032* (2013.01); *F05D 2270/312* (2013.01); *F05D 2270/313* (2013.01); *F05D 2270/42* (2013.01)

(56) References Cited

U.S. PATENT DOCUMENTS

| | | |
|---|---|---|
| 2012/0102966 A1 | 5/2012 | Haruyama et al. |
| 2014/0090353 A1 | 4/2014 | Simons et al. |
| 2014/0144156 A1 | 5/2014 | Lang et al. |
| 2015/0000297 A1 | 1/2015 | Arias Chao et al. |
| 2015/0354466 A1 | 12/2015 | Higashi et al. |
| 2016/0195023 A1 | 7/2016 | Andersson et al. |
| 2016/0326967 A1 | 11/2016 | Yamamoto et al. |
| 2017/0074175 A1 | 3/2017 | Uyama et al. |

FOREIGN PATENT DOCUMENTS

| | | |
|---|---|---|
| CN | 102472170 | 5/2012 |
| CN | 103711556 | 4/2014 |
| CN | 103850803 | 6/2014 |
| CN | 104919250 | 9/2015 |
| CN | 104968918 | 10/2015 |
| CN | 104968918 | 3/2017 |
| JP | 2003-293795 | 10/2003 |
| JP | 2006-29162 | 2/2006 |
| JP | 2015-512483 | 4/2015 |
| WO | 2015/129498 | 9/2015 |
| WO | 2015/146994 | 10/2015 |

OTHER PUBLICATIONS

Office Action dated Mar. 18, 2020 in corresponding Chinese Patent Application No. 201680083290.8; with English Translation.

\* cited by examiner

CONTROL DEVICE FOR GAS TURBINE AND CONTROL METHOD FOR GAS TURBINE

FIELD

The present invention relates to a control device for a gas turbine and a control method for a gas turbine.

BACKGROUND

A gas turbine includes a compressor, a combustor, and a turbine. Air taken in from an air intake port is compressed by the compressor into high-temperature, high-pressure compressed air. The combustor burns fuel supplied to the compressed air to obtain a high-temperature, high-pressure combustion gas (working fluid), and the combustion gas drives a turbine to drive a generator connected to the turbine. The combustion gas that has driven the turbine is discharged as flue gas from an exhaust side of the gas turbine.

A control device that controls the gas turbine adjusts, for example, the supply amount of the fuel to perform temperature adjustment control of controlling operation of the gas turbine so as to prevent the temperature of the combustion gas flowing into the turbine from exceeding a preset upper limit temperature. Since the combustion gas has a high temperature and high pressure, the temperature thereof is difficult to be directly measured. Accordingly, for example, as described in Japanese Patent Application Publication No. 2006-029162, the temperature of the combustion gas is calculated as an estimate value based on, for example, a detection value of a temperature of the flue gas. The control device uses the calculated estimate value as the temperature of the combustion gas to perform the temperature adjustment control.

SUMMARY

Technical Problem

The estimate value of the combustion gas temperature calculated from the detection value of the flue gas temperature has a relatively small error with respect to the actual temperature of the combustion gas, and thus, is high in calculation accuracy. However, a change in the flue gas temperature is greatly delayed in time with respect to a change in the combustion gas temperature, and thus, is low in response. The estimate value of the temperature of the combustion gas can also be calculated from, for example, the supply amount of the fuel. The estimate value of the temperature of the combustion gas calculated from the supply amount of the fuel is higher in response to the change in the actual combustion gas temperature, but is lower in the calculation accuracy. Hence, the estimate value of the combustion gas temperature is required to be calculated with high response and high calculation accuracy.

The present invention has been made in view of the above, and it is an object thereof to provide a control device for a gas turbine and a control method for a gas turbine that calculate the estimate value of the combustion gas temperature with high response and high calculation accuracy.

Solution to Problem

To solve the above-described problem and achieve the object, a control device for a gas turbine according to the present disclosure is a control device for a gas turbine that includes a compressor that compresses air supplied from an air supply line; a combustor to which fuel is supplied and that burns the compressed air compressed by the compressor; a turbine that is rotated by a combustion gas generated in the combustor; a flue gas discharge line through which flue gas is discharged, the flue gas being the combustion gas that has rotated the turbine; and a generator that generates electric power by being rotated by the turbine. The control device includes a detection value acquisition unit configured to acquire a detection value of at least one of a supply amount of the fuel, pressure of the compressed air, and electric power generated by the generator; a flue gas temperature acquisition unit configured to acquire a flue gas temperature detection value representing a detection value of a temperature of the flue gas; a combustion gas temperature estimate value calculation unit configured to calculate, based on the detection value acquired by the detection value acquisition unit, a combustion gas temperature estimate value representing an estimated temperature of the combustion gas; a correction term acquisition unit configured to calculate a correction term for correcting the combustion gas temperature estimate value based on a ratio between the combustion gas temperature estimate value and the flue gas temperature detection value; a corrected combustion gas temperature estimate value calculation unit configured to correct the combustion gas temperature estimate value using the correction term to calculate a corrected combustion gas temperature estimate value; and a gas turbine controller configured to control the gas turbine based on the corrected combustion gas temperature estimate value.

This control device corrects the combustion gas temperature estimate value that is highly responsive to the temperature change using the correction term calculated based on the flue gas temperature detection value that is high in calculation accuracy, so as to calculate the corrected combustion gas temperature estimate value. Accordingly, this control device can calculate the temperature estimate value of the combustion gas (corrected combustion gas temperature estimate value) that is high in response and also high in calculation accuracy.

It is preferable that the control device for a gas turbine further includes a flue gas temperature estimate value acquisition unit configured to calculate a flue gas temperature estimate value representing an estimated temperature of the flue gas based on the combustion gas temperature estimate value, and the correction term acquisition unit is configured to calculate the correction term based on a ratio between the flue gas temperature estimate value and the flue gas temperature detection value. This control device calculates the correction term based on the temperatures of the flue gas, and therefore, can accurately calculate the correction term.

In the control device for a gas turbine, it is preferable that the correction term acquisition unit is configured to calculate, as the correction term, the ratio of the flue gas temperature detection value to the flue gas temperature estimate value, and the corrected combustion gas temperature estimate value calculation unit is configured to multiply the combustion gas temperature estimate value by the correction term to calculate the corrected combustion gas temperature estimate value. By calculating the correction term and the corrected combustion gas temperature estimate value in this manner, this control device can further improve the calculation accuracy of the corrected combustion gas temperature estimate value.

In the control device for a gas turbine, it is preferable that the correction term acquisition unit includes a ratio calculation unit configured to calculate the ratio of the flue gas temperature detection value to the flue gas temperature estimate value; an adjustment coefficient setting unit configured to set an adjustment coefficient for the ratio to a value larger than 0 and equal to or smaller than 1; an adjustment ratio calculation unit configured to multiply the ratio by the adjustment coefficient to calculate an adjustment ratio; a past adjustment ratio calculation unit configured to multiply a previously calculated correction term by a value obtained by subtracting the adjustment coefficient from 1 to calculate a past adjustment ratio; and a correction term calculation unit configured to add the past adjustment ratio to the adjustment ratio to calculate the correction term. By calculating the correction term using the past value, this control device can further improve the calculation accuracy of the corrected combustion gas temperature estimate value.

In the control device for a gas turbine, it is preferable that the flue gas temperature estimate value acquisition unit includes a temporary flue gas temperature estimate value acquisition unit configured to enter the combustion gas temperature estimate value into a predetermined calculation expression defined in advance to calculate a temporary flue gas temperature estimate value; and a flue gas temperature estimate value calculation unit configured to calculate the flue gas temperature estimate value by performing first-order lag processing of delaying a change with time of a value of the temporary flue gas temperature estimate value. This control device calculates the flue gas temperature estimate value reflecting a relation of the first-order lag, and consequently, can more accurately calculate the correction term X.

In the control device for a gas turbine, it is preferable that the flue gas temperature acquisition unit is configured to acquire an upstream flue gas temperature detection value and a downstream flue gas temperature detection value, the upstream flue gas temperature detection value representing a temperature of the flue gas at an immediate rear of the turbine, the downstream flue gas temperature detection value representing a temperature of the flue gas on a downstream side of a place where the upstream flue gas temperature detection value is detected. It is preferable that the control device further includes a downstream flue gas temperature estimate value acquisition unit configured to acquire a downstream flue gas temperature estimate value representing an estimate value of the temperature of the flue gas on the downstream side based on the upstream flue gas temperature detection value; an upstream correction term acquisition unit configured to calculate, based on a ratio between the downstream flue gas temperature detection value and the downstream flue gas temperature estimate value, an upstream correction term for correcting the upstream flue gas temperature detection value; and a corrected upstream flue gas temperature detection value calculation unit configured to correct the upstream flue gas temperature detection value using the upstream correction term to calculate a corrected upstream flue gas temperature detection value. It is preferable that the correction term acquisition unit is configured to use the corrected upstream flue gas temperature detection value as the flue gas temperature detection value to calculate the correction term. By using the upstream correction term to calculate the corrected combustion gas temperature estimate value, this control device can more appropriately improve the response and the calculation accuracy of the corrected combustion gas temperature estimate value.

It is preferable that the control device for a gas turbine further includes a combustion gas temperature comparison value acquisition unit configured to perform a heat balance calculation using the flue gas temperature detection value to calculate a combustion gas temperature comparison value representing the estimated temperature of the flue gas, and the correction term acquisition unit is configured to calculate the correction term based on a ratio between the combustion gas temperature estimate value and the combustion gas temperature comparison value. This control device calculates the corrected combustion gas temperature estimate value using the combustion gas temperature comparison value that is high in calculation accuracy. Accordingly, this control device can calculate the corrected combustion gas temperature estimate value that is high in calculation accuracy and higher in response.

To solve the above-described problem and achieve the object, a control method for a gas turbine according to the present disclosure is a control method for a gas turbine that includes a compressor that compresses air supplied from an air supply line; a combustor to which fuel is supplied and that burns the compressed air compressed by the compressor; a turbine that is rotated by a combustion gas generated in the combustor; a flue gas discharge line through which flue gas is discharged, the flue gas being the combustion gas that has rotated the turbine; and a generator that generates electric power by being rotated by the turbine. The control method includes a detection value acquisition step of acquiring a detection value of at least one of a supply amount of the fuel, pressure of the compressed air, and electric power generated by the generator; a flue gas temperature acquisition step of acquiring a flue gas temperature detection value representing a detection value of a temperature of the flue gas; a combustion gas temperature estimate value calculation step of calculating, based on the detection value acquired at the acquiring the detection value, a combustion gas temperature estimate value representing an estimated temperature of the combustion gas; a correction term acquisition step of calculating a correction term for correcting the combustion gas temperature estimate value based on a ratio between the combustion gas temperature estimate value and the flue gas temperature detection value; a corrected combustion gas temperature estimate value calculation step of correcting the combustion gas temperature estimate value using the correction term to calculate a corrected combustion gas temperature estimate value; and a gas turbine control step of controlling the gas turbine based on the corrected combustion gas temperature estimate value. Use of this control method enables the calculation of the temperature estimate value of the combustion gas (corrected combustion gas temperature estimate value) that is high in response and also high in calculation accuracy.

Advantageous Effects of Invention

According to the present invention, the estimate value of the combustion gas temperature can be calculated with high response and high calculation accuracy.

DESCRIPTION OF EMBODIMENTS

Preferred embodiments according to the present invention will now be described in detail with reference to the accompanying drawings. The embodiments is not intended to limit the present invention. When the following description includes a plurality of embodiments, each of the embodiments can be combined.

First Embodiment

Configuration of Gas Turbine

Figure 1:
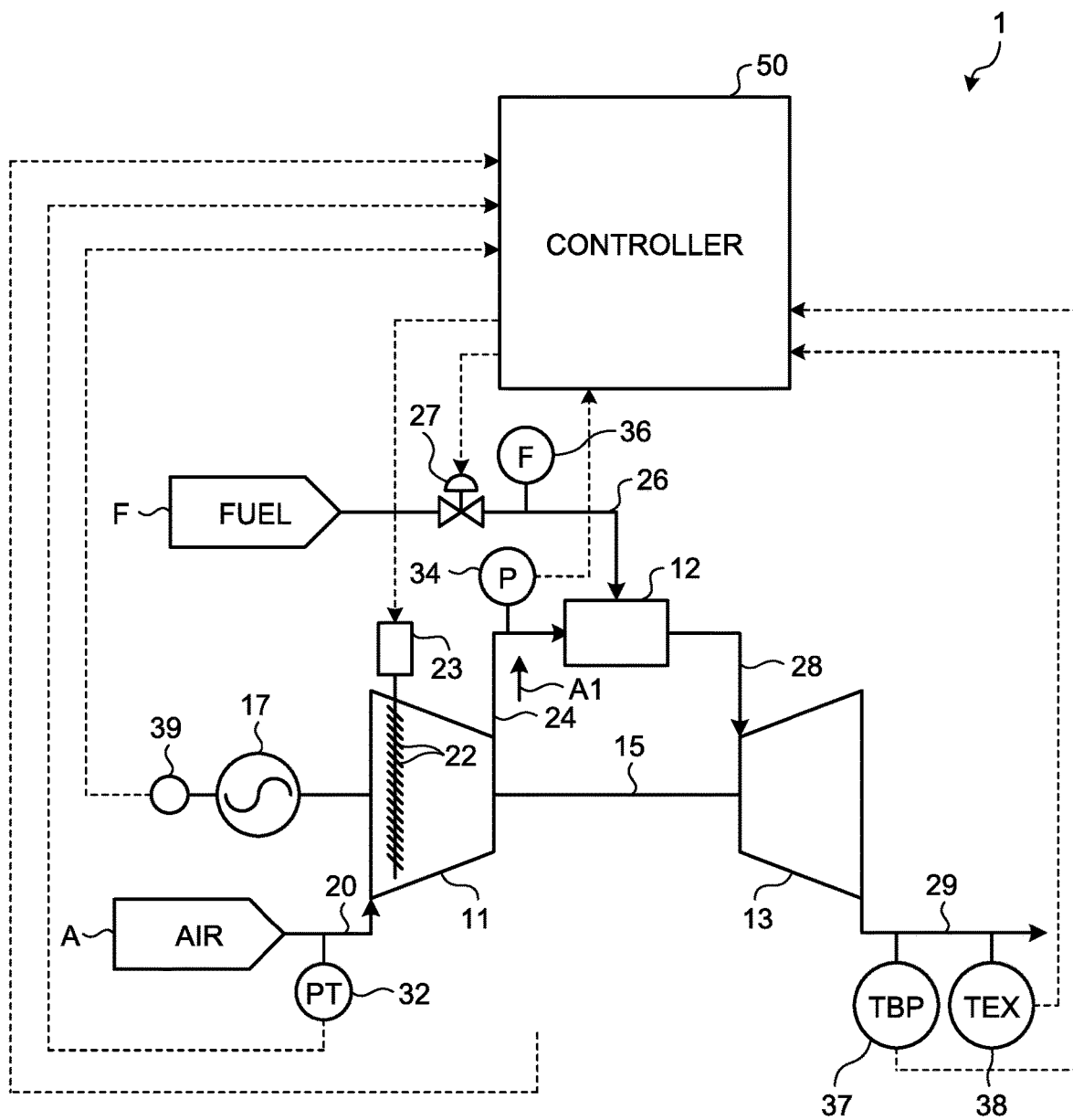
FIG. 1 is a schematic diagram illustrating a gas turbine according to a first embodiment of the present invention.

FIG. 1 is a schematic diagram illustrating a gas turbine according to a first embodiment. As illustrated in FIG. 1, a gas turbine 1 according to the first embodiment includes a compressor 11, a combustor 12, a turbine 13, and a generator 17. A rotor 15 is disposed so as to penetrate central portions of the compressor 11, the combustor 12, and the turbine 13. The compressor 11 and the turbine 13 are connected by the rotor 15 so as to be rotatable integrally with each other. The rotor 15 is rotatably supported at both ends in the axial direction thereof by bearing portions (not illustrated), and thus, is provided so as to be rotatable about the axial center. The drive shaft of the generator 17 is connected to an end on the compressor 11 side of the rotor 15. The generator 17 is provided coaxially with the turbine 13, and generates electric power by being rotated by the turbine 13. The gas turbine 1 is controlled by a controller 50 serving as a control device.

The compressor 11 compresses air A taken in from an air supply line 20 into compressed air A1. In the compressor 11, inlet guide vanes (IGVs, as an air intake valve) 22 that adjust the intake amount of the air A taken in from the air supply line 20 are disposed. After the air A taken in from the air supply line 20 passes through the inlet guide vanes 22, the air A passes through the inside of the compressor 11 and is compressed into the high-temperature, high-pressure compressed air A1. An opening adjuster 23 adjusts the opening of the inlet guide vanes 22 to adjust the intake amount of the air A. An increase in the opening of the inlet guide vanes 22 increases the intake amount of the air A, and thus, increases the pressure ratio of the compressor 11. In contrast, a reduction in the opening of the inlet guide vanes 22 reduces the intake amount of the air A, and thus, reduces the pressure ratio of the compressor 11. In the present embodiment, the opening adjuster 23 adjusts the opening of the inlet guide vanes 22 based on a command of the controller 50.

The combustor 12 supplies fuel F to the compressed air A1 compressed in the compressor 11, and mixes and burns the compressed air A1 and the fuel F to generate a combustion gas. The combustor 12 is connected to the compressor 11 through a compressed air conducting line 24. The compressed air A1 is supplied to the combustor 12 from the compressor 11 through the compressed air conducting line 24. The fuel F is supplied to combustor 12 is supplied from a fuel supply line 26. The compressed air A1 and the fuel F supplied into the combustor 12 are mixed and burned to generate a high-temperature, high-pressure combustion gas I. The fuel supply line 26 is provided with a fuel supply valve 27. The opening of the fuel supply valve 27 is adjusted to adjust the supply amount of the fuel F to the compressor 11. In the present embodiment, the controller 50 controls the opening of the fuel supply valve 27 to adjust the supply amount of the fuel F to the compressor 11.

The combustion gas I is supplied to the turbine 13 from the combustor 12 through a combustion gas supply line 28. The combustion gas I passes through the inside of the turbine 13 to operate (rotate) the turbine 13 to drive and rotate the rotor 15, thereby driving the generator 17 connected to the rotor 15. With this, the generator 17 connected to the rotor 15 is rotationally driven so as to generate the electric power. A flue gas discharge line 29 is a pipe connected to the rear stage of the turbine 13 (on a side thereof opposite to the combustion gas supply line 28). The combustion gas I that has driven the turbine 13 is discharged as flue gas O through the flue gas discharge line 29 to the atmosphere.

As illustrated in FIG. 1, the gas turbine 1 is provided with an intake air detector 32, a casing detector 34, a fuel detector 36, a blade path thermometer 37, a flue gas thermometer 38, and an output meter 39. The intake air detector 32 is provided in the air supply line 20, and detects the intake air temperature and the intake air pressure of the air A taken into the compressor 11. The casing detector 34 is provided in the compressed air conducting line 24, that is, in a casing of the combustor 12, and measures the pressure (casing pressure) of the compressed air A1 and the temperature (casing temperature) of the compressed air A1. The fuel detector 36 is provided on the combustor 12 side of the fuel supply valve 27 in the fuel supply line 26, and detects the supply amount of the fuel F to the compressor 11 and the temperature of the fuel F. However, the fuel detector 36 does not necessarily detect the supply amount of the fuel F. Instead, the controller 50 may calculate the supply amount of the fuel F to the compressor 11 based on the current opening of the fuel supply valve 27.

The blade path thermometer 37 is provided in the flue gas discharge line 29, and measures the temperature (blade path temperature) of the flue gas O immediately after passing through final stage blades of the turbine 13 that are provided on the downstream side thereof in the flowing direction of the flue gas O. The flue gas thermometer 38 is provided on the downstream side of the blade path thermometer 37 in the flue gas discharge line 29, and measures the temperature of the flue gas O flowing on the downstream side of the blade path thermometer 37. The flue gas thermometer 38 is preferably provided at a place where the temperature distribution of the flue gas O is uniformized, and is preferably provided at a place away from the blade path thermometer 37 toward the downstream side thereof to the extent that rotation of the turbine blades does not have an influence and the temperature distribution of the flue gas O is uniformized. However, the flue gas thermometer 38 may be located in any position, as long as being located on the downstream side of the blade path thermometer 37. The output meter 39 detects the output of the generator 17, that is, system power generated by the generator 17. The intake air detector 32, the casing detector 34, the fuel detector 36, the blade path thermometer 37, the flue gas thermometer 38, and the output meter 39 transmit detected values to the controller 50.

Hereinafter, the temperature of the flue gas O detected by the flue gas thermometer 38 is referred to as a flue gas temperature detection value O1. The pressure of the compressed air A1 and the temperature of the compressed air A1 detected by the casing detector 34, and the supply amount of the fuel F and the temperature of the fuel F detected by the fuel detector 36 are each referred to as a detection value I1 when they are not distinguished from one another.

Controller

Figure 2:
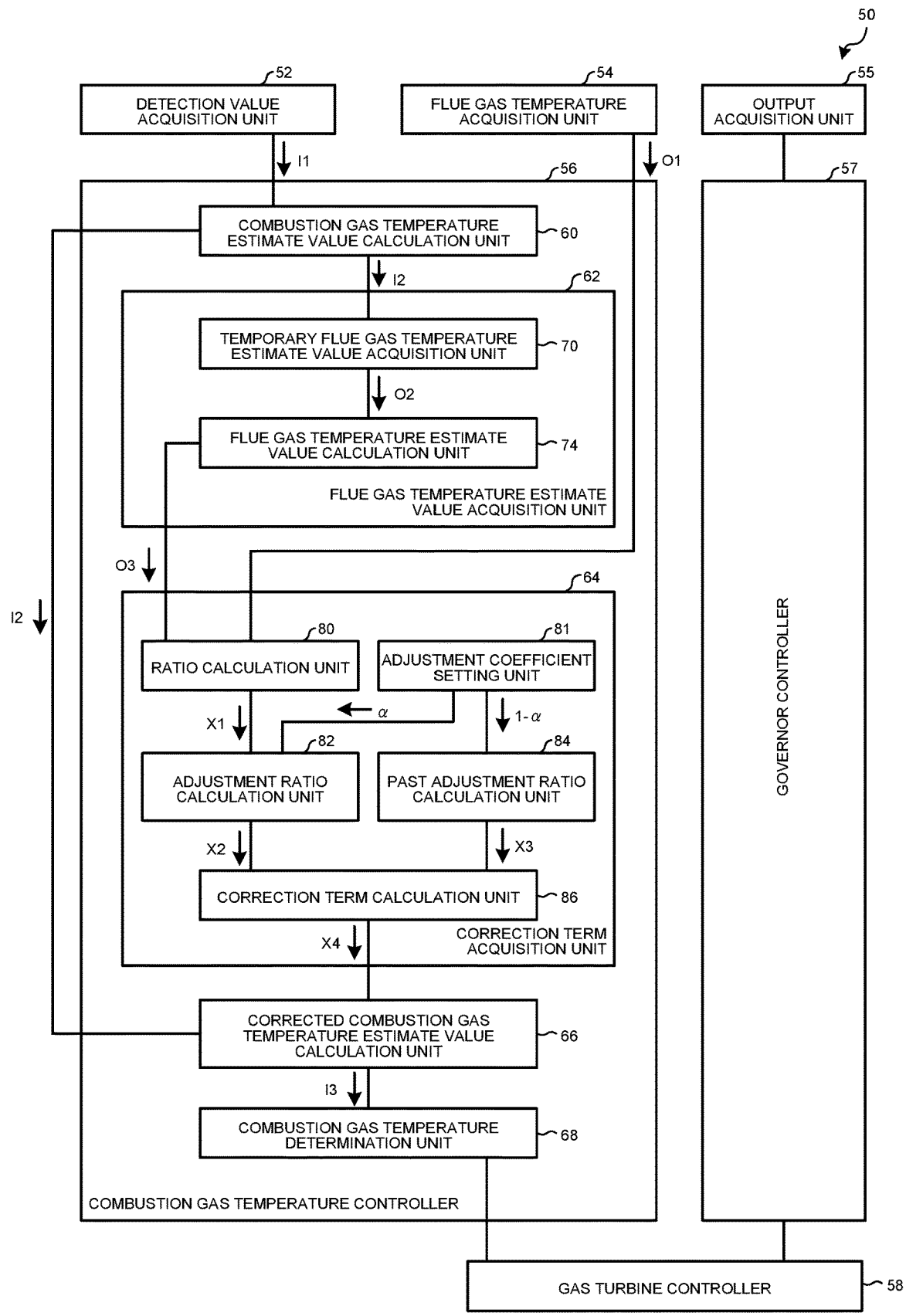
FIG. 2 is a block diagram of a controller according to the first embodiment.

The following describes the controller 50. FIG. 2 is a block diagram of the controller according to the first embodiment. As illustrated in FIG. 2, the controller 50 includes a detection value acquisition unit 52, a flue gas temperature acquisition unit 54, an output acquisition unit 55, a combustion gas temperature controller 56, a governor controller 57, and a gas turbine controller 58. The detection value acquisition unit 52 acquires the detection values I1 from the intake air detector 32, the casing detector 34, and the fuel detector 36. The flue gas temperature acquisition unit 54 acquires the flue gas temperature detection value O1 from the flue gas thermometer 38. The output acquisition unit 55 acquires the system power, more in detail, the frequency of the system power generated by the generator 17 from the output meter 39. The combustion gas temperature controller 56 performs temperature adjustment control, and calculates an estimate value of the temperature of the combustion gas I and determines whether the estimate value of the temperature of the combustion gas I is higher than a temperature threshold. The governor controller 57 acquires the frequency of the system power from the output acquisition unit 55, and determines the operating condition of the gas turbine 1 based on this system frequency. The gas turbine controller 58 acquires the determination result from the combustion gas temperature controller 56 and the information on the operating condition from the governor controller 57, determines the supply amount of the fuel F to the compressor 11, and controls the opening of the fuel supply valve 27 so as to achieve the determined supply amount. However, the gas turbine controller 58 needs not adjust the opening of the fuel supply valve 27 as long as being capable of controlling the gas turbine 1, and may control, for example, the intake amount of the air A.

Figure 3:
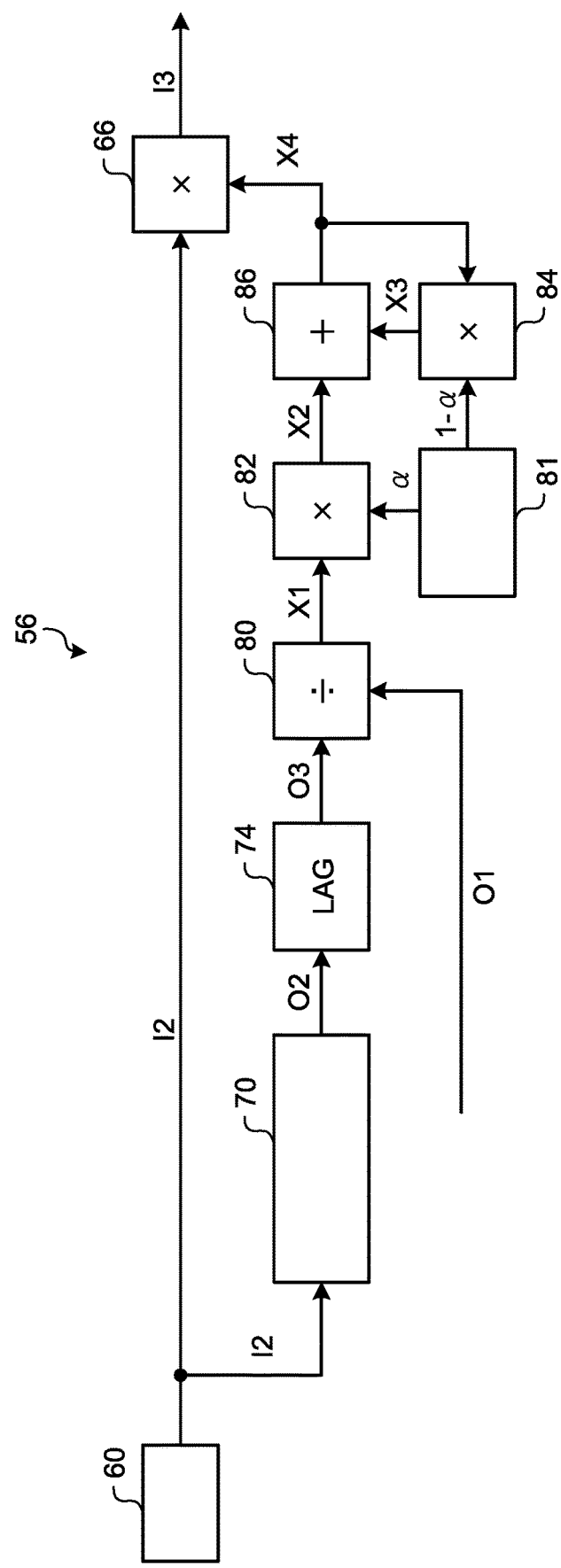
FIG. 3 is a pseudo-circuit diagram of a combustion gas temperature controller.

FIG. 3 is a pseudo-circuit diagram of the combustion gas temperature controller. The following describes the configuration of the combustion gas temperature controller 56 based on FIGS. 2 and 3. Specifically, as illustrated in FIG. 2, the combustion gas temperature controller 56 includes a combustion gas temperature estimate value calculation unit 60, a flue gas temperature estimate value acquisition unit 62, a correction term acquisition unit 64, a corrected combustion gas temperature estimate value calculation unit 66, and a combustion gas temperature determination unit 68.

The combustion gas temperature estimate value calculation unit 60 calculates a combustion gas temperature estimate value I2 based on the detection values I1 acquired by the detection value acquisition unit 52. The combustion gas temperature estimate value I2 is the estimate value of the temperature of the combustion gas I, more in detail, the estimated temperature of the combustion gas I immediately before entering the turbine 13. Specifically, the combustion gas temperature estimate value calculation unit 60 calculates the flow rate of the compressed air A1 based on the pressure of the compressed air A1 among the detection values I1. The combustion gas temperature estimate value calculation unit 60 applies lag compensation to the flow rate of the compressed air A1, and to the temperature of the compressed air A1, the supply amount of the fuel F, and the temperature of the fuel F among the detection values I1. Using the flow rate of the compressed air A1, the temperature of the compressed air A1, the supply amount of the fuel F, and the temperature of the fuel F that have been subjected to the lag compensation, the combustion gas temperature estimate value calculation unit 60 calculates the combustion gas temperature estimate value I2 using Expression (1) below.

$$c_{P4} \cdot V_{cb} \cdot \gamma_4 (dI2/dt) = c_{pf} \cdot G_f \cdot T_f + c_{P3} \cdot G_3 \cdot T_3 + \eta \cdot H_f \cdot G_f - c_{P4} \ast G_4 \ast T_4 \qquad (1)$$

$T_3$ is the temperature (casing temperature) of the compressed air A1 after being subjected to the lag compensation. $T_f$ is the temperature of the fuel F after being subjected to the lag compensation. $G_3$ is the flow rate of the compressed air A1 after being subjected to the lag compensation. $G_f$ is the supply amount of the fuel F after being subjected to the lag compensation. In other words, these are values based on the detection values I1. $G_4$ is the flow rate of the combustion gas I, and is equal to $G_3+G_f$. $c_{P3}$ is the specific heat of the casing. $c_{pf}$ is the specific heat of the fuel. $c_{P4}$ is the specific heat of the combustion gas. $H_f$ is a calorific value. $\eta$ is the thermal efficiency of the combustor 12. $V_{cb}$ is a volume from the casing to a transition piece. $\gamma_4$ is the specific gravity of the combustion gas. $c_{P3}$, $c_{pf}$, $c_{P4}$, $H_f$, $\eta$, $V_{cb}$, and $\gamma_4$ are physical property values or design values, and are values determined in advance.

In this manner, the combustion gas temperature estimate value calculation unit 60 calculates the combustion gas temperature estimate value I2 based on the detection values of the flow rate of the compressed air A1, the temperature of the compressed air A1, the supply amount of the fuel F, and the temperature of the fuel F that are the detection values I1. However, the method for calculation of the combustion gas temperature estimate value I2 performed by the combustion gas temperature estimate value calculation unit 60 is not limited to this method. The combustion gas temperature estimate value calculation unit 60 only needs to calculate the combustion gas temperature estimate value I2 based on at least one of the detection values of the supply amount of the fuel F and the pressure of the compressed air A1. The combustion gas temperature estimate value calculation unit 60 may use, as the detection value I1, the system power generated by the generator 17 that is detected by the output meter 39, in other words, the power (MW) that is the output of the generator 17. In other words, the combustion gas temperature estimate value calculation unit 60 may calculate the combustion gas temperature estimate value I2 based on the detection value I1 that is the system power. However, the combustion gas temperature estimate value calculation unit 60 does not calculate the combustion gas temperature estimate value I2 based on the detection value of the temperature of the flue gas O.

The flue gas temperature estimate value acquisition unit 62 calculates a flue gas temperature estimate value O3 based on the combustion gas temperature estimate value I2. The flue gas temperature estimate value O3 is an estimate value of the temperature of the flue gas O when the temperature of the combustion gas I at the entrance of the turbine 13 is assumed to be the combustion gas temperature estimate value I2. As illustrated in FIG. 2, the flue gas temperature estimate value acquisition unit 62 includes a temporary flue gas temperature estimate value acquisition unit 70 and a flue gas temperature estimate value calculation unit 74.

The temporary flue gas temperature estimate value acquisition unit 70 acquires the combustion gas temperature estimate value I2 from the combustion gas temperature estimate value calculation unit 60, and enters the combustion gas temperature estimate value I2 into a predetermined calculation expression defined in advance to calculate a temporary flue gas temperature estimate value O2. This calculation expression is an expression for converting the temperature of the combustion gas I at the entrance of the turbine 13 into the temperature of the flue gas O at the exit thereof. For example, the temporary flue gas temperature estimate value acquisition unit 70 calculates the temporary flue gas temperature estimate value O2 using a calculation expression that assumes adiabatic expansion as given by Expression (2) below.

$$O2 = I2 \cdot Pr^{\{(1-n)/n\}} \quad (2)$$

Here, Pr is the pressure ratio, and n is the polytropic index.

However, the temporary flue gas temperature estimate value acquisition unit 70 is not limited to using Expression (2) given above, and may calculate the temporary flue gas temperature estimate value O2 using any method, as long as the method is for calculating the temperature of the flue gas O (temporary flue gas temperature estimate value O2) when the temperature of the combustion gas I at the entrance of the turbine 13 is assumed to be the combustion gas temperature estimate value I2.

The flue gas temperature estimate value calculation unit 74 calculates the flue gas temperature estimate value O3 by performing first-order lag processing of delaying the change with time of the value of the temporary flue gas temperature estimate value O2. Specifically, the flue gas temperature estimate value calculation unit 74 stores therein a temperature relational expression representing a relation in time between the temperature of the combustion gas I and the temperature of the flue gas O. This temperature relational expression is a relational expression of a first-order lag system in which the temperature change of the flue gas O lags behind the temperature change of the combustion gas I.

Figure 4:
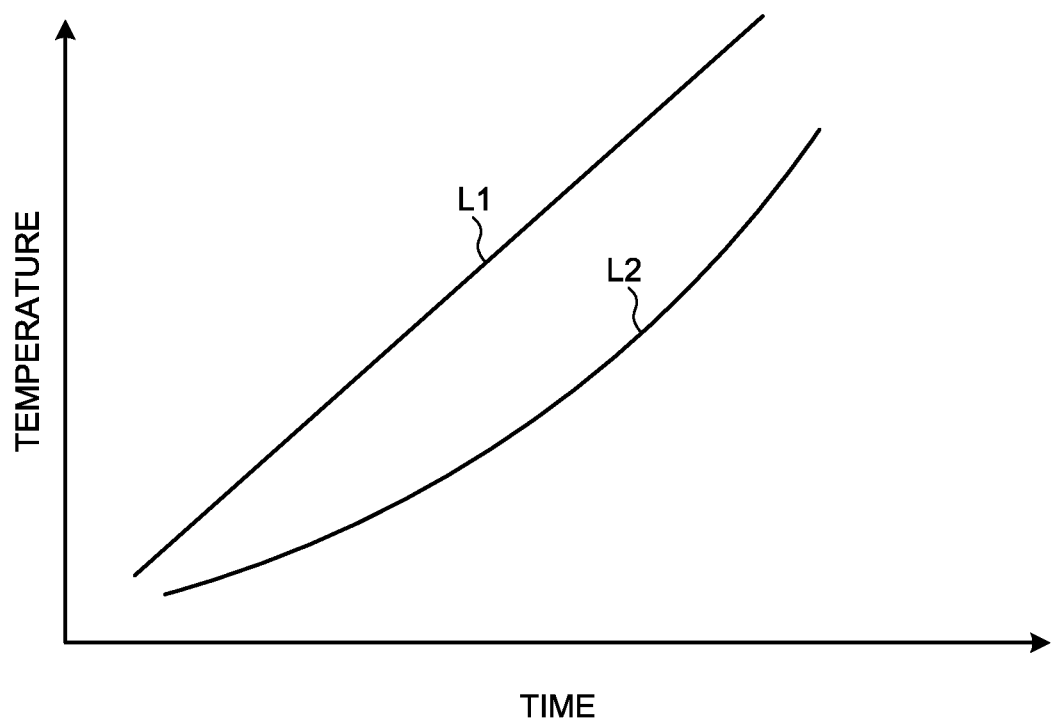
FIG. 4 is a graph illustrating an example of a first-order lag.

FIG. 4 is a graph illustrating an example of the first-order lag. The horizontal axis of FIG. 4 represents time, and the vertical axis thereof represents temperature. A line segment L1 in FIG. 4 illustrates an example of the temperature of the combustion gas I at each time point. A line segment L2 in FIG. 4 illustrates an example of the temperature of the flue gas O at each time point when the temperature of the combustion gas I changes as represented by the line segment L1. As represented by the line segment L2, the temperature of the flue gas O changes with a time lag with respect to the temperature change of the combustion gas I. In other words, the temperature of the flue gas O has a relation of the first-order lag with the temperature of the combustion gas I. The temperature relational expression is a relational expression that delays the temperature change of the flue gas O with respect to the temperature change of the combustion gas I in order to reflect the relation of the first-order lag as described above. Since the temporary flue gas temperature estimate value O2 is calculated based on the combustion gas temperature estimate value I2 representing the temperature of the combustion gas I, the relation of the first-order lag, such as that of the actual flue gas O, is not reflected. The flue gas temperature estimate value calculation unit 74 enters the temporary flue gas temperature estimate value O2 into the temperature relational expression to perform the first-order lag processing, and thus, calculates the flue gas temperature estimate value O3. The flue gas temperature estimate value O3 has been subjected to the first-order lag processing, and therefore, reflects the relation of the first-order lag. In other words, the flue gas temperature estimate value calculation unit 74 has a function as a first-order lag circuit, as illustrated in FIG. 3.

The correction term acquisition unit 64 illustrated in FIG. 2 calculates, based on the ratio between the flue gas temperature detection value O1 and the combustion gas temperature estimate value I2, a correction term X4 for correcting the combustion gas temperature estimate value I2. In the present embodiment, the correction term acquisition unit 64 calculates the correction term X4 based on the ratio between the flue gas temperature detection value O1 and the flue gas temperature estimate value O3 that has been calculated based on the combustion gas temperature estimate value I2. Specifically, as illustrated in FIG. 2, the correction term acquisition unit 64 includes a ratio calculation unit 80, an adjustment coefficient setting unit 81, an adjustment ratio calculation unit 82, a past adjustment ratio calculation unit 84, and a correction term calculation unit 86.

The ratio calculation unit 80 calculates a ratio X1 of the flue gas temperature detection value O1 to the flue gas temperature estimate value O3. In other words, as illustrated in FIG. 3, the ratio calculation unit 80 divides the flue gas temperature detection value O1 by the flue gas temperature estimate value O3 to calculate the ratio X1, as given by Expression (3) below.

$$X1 = O1/O3 \quad (3)$$

The adjustment coefficient setting unit 81 sets an adjustment coefficient $\alpha$ for the ratio to a value larger than 0 and equal to or smaller than 1. The adjustment coefficient setting unit 81 sets a predetermined value larger than 0 and equal to or smaller than 1 as the adjustment coefficient $\alpha$, for example, through setting by an operator. The adjustment ratio calculation unit 82 acquires the ratio X1 from the ratio calculation unit 80, and acquires the adjustment coefficient $\alpha$ from the adjustment coefficient setting unit 81. As illustrated in FIG. 3, the adjustment ratio calculation unit 82 multiplies the ratio X1 by the adjustment coefficient $\alpha$ to calculate an adjustment ratio X2, as given by Expression (4) below.

$$X2 = \alpha \cdot X1 \quad (4)$$

The past adjustment ratio calculation unit 84 stores therein a past correction term X4' that is the previously calculated correction term X4. The past adjustment ratio calculation unit 84 acquires information on a value obtained by subtracting the adjustment coefficient $\alpha$ from 1, that is, a value of $1-\alpha$. The past adjustment ratio calculation unit 84 multiplies the past correction term X4' by $1-\alpha$ to calculate a past adjustment ratio X3, as given by Expression (5) below.

$$X3 = (1-\alpha) \cdot X4' \quad (5)$$

The correction term calculation unit 86 calculates the correction term X4 based on the adjustment ratio X2. Specifically, as illustrated in FIG. 3, the correction term calculation unit 86 adds the past adjustment ratio X3 to the adjustment ratio X2 to calculate the correction term X4, as given by Expression (6) below.

$$X4 = X2 + X3 \quad (6)$$

The correction term X4 thus calculated is a value based on the ratio between the flue gas temperature detection value O1 and the combustion gas temperature estimate value I2, and can be said to be a correction term for correcting the estimate value of the temperature of the combustion gas I using the detection value of the temperature of the flue gas O.

The corrected combustion gas temperature estimate value calculation unit 66 corrects the combustion gas temperature estimate value I2 using the correction term X4 to calculate a corrected combustion gas temperature estimate value I3. Specifically, as illustrated in FIG. 3, the corrected combustion gas temperature estimate value calculation unit 66 multiplies the combustion gas temperature estimate value I2 by the correction term X4 to calculate the corrected combustion gas temperature estimate value I3, as given by Expression (7) below.

$$I3 = X4 \cdot I2 \tag{7}$$

The combustion gas temperature determination unit 68 determines whether the corrected combustion gas temperature estimate value I3 is higher than a temperature threshold $I_{th}$. The temperature threshold $I_{th}$ is a predetermined upper limit value of the temperature of the combustion gas I. If the corrected combustion gas temperature estimate value I3 is lower than the temperature threshold $I_{th}$, the combustion gas temperature determination unit 68 transmits a normal signal to the gas turbine controller 58. If the normal signal is acquired, the gas turbine controller 58 selects normal operation according to the operating condition acquired from the governor controller 57, and determines the supply amount of the fuel F for performing the normal operation. The gas turbine controller 58 controls the opening of the fuel supply valve 27 so as to achieve the determined supply amount.

If the corrected combustion gas temperature estimate value I3 is higher than the temperature threshold $I_{th}$, the combustion gas temperature determination unit 68 transmits an output limiting signal to the gas turbine controller 58. If the output limiting signal is acquired, the gas turbine controller 58 selects output limiting operation to reduce the output to a lower value than that of the normal operation, and determines the supply amount of the fuel F for performing the output limiting operation. The gas turbine controller 58 controls the opening of the fuel supply valve 27 so as to achieve the determined supply amount. The supply amount of the fuel F for performing the output limiting operation is smaller than the supply amount of the fuel F for performing the normal operation. Thus, the controller 50 can restrain the temperature of the combustion gas I from rising.

Figure 5:
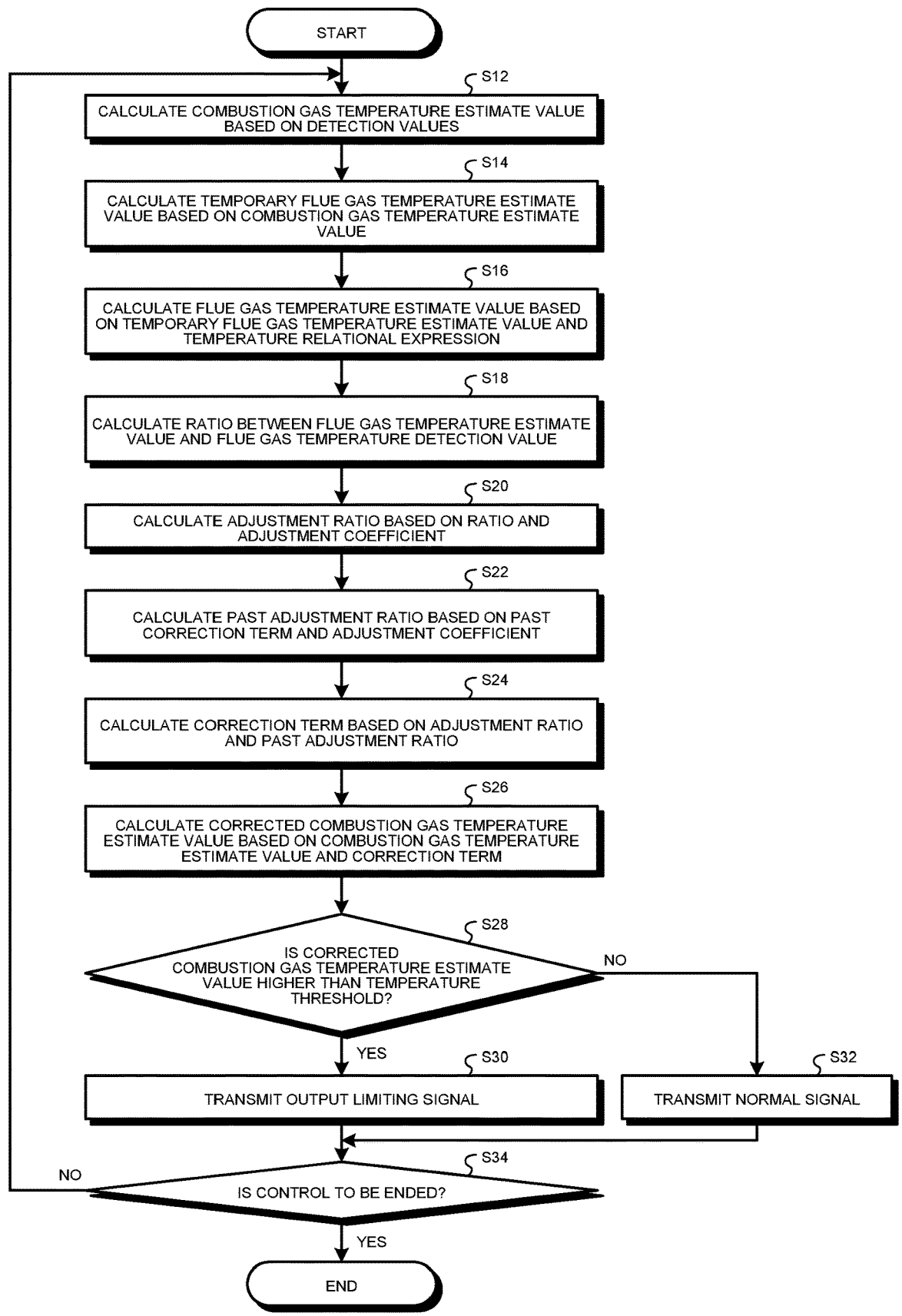
FIG. 5 is a flowchart explaining a control flow of the combustion gas temperature controller according to the first embodiment.

The following describes a control flow of the combustion gas temperature controller 56 described above based on a flowchart. FIG. 5 is the flowchart explaining the control flow of the combustion gas temperature controller according to the first embodiment. As illustrated in FIG. 5, the combustion gas temperature controller 56 first uses the combustion gas temperature estimate value calculation unit 60 to calculate the combustion gas temperature estimate value I2 based on the detection values I1 acquired by the detection value acquisition unit 52 (Step S12).

After the combustion gas temperature estimate value I2 is calculated, the combustion gas temperature controller 56 uses the temporary flue gas temperature estimate value acquisition unit 70 to calculate the temporary flue gas temperature estimate value O2 based on the combustion gas temperature estimate value I2 (Step S14), and uses the flue gas temperature estimate value calculation unit 74 to calculate the flue gas temperature estimate value O3 based on the temporary flue gas temperature estimate value O2 and the temperature relational expression (Step S16).

After the flue gas temperature estimate value O3 is calculated, the combustion gas temperature controller 56 uses the ratio calculation unit 80 to calculate the ratio X1 based on the flue gas temperature estimate value O3 and the flue gas temperature detection value O1 (Step S18), uses the adjustment ratio calculation unit 82 to calculate the adjustment ratio X2 based on the ratio X1 and the adjustment coefficient α (Step S20), and uses the past adjustment ratio calculation unit 84 to calculate the past adjustment ratio X3 based on the past correction term X4' and the adjustment coefficient α (specifically, 1−α) (Step S22). After the adjustment ratio X2 and the past adjustment ratio X3 are calculated, the combustion gas temperature controller 56 uses the correction term calculation unit 86 to calculate the correction term X4 based on the adjustment ratio X2 and the past adjustment ratio X3 (Step S24). The correction term X4 is a correction term for correcting the estimate value of the temperature of the combustion gas I using the detection value of the temperature of the flue gas O.

After the correction term X4 is calculated, the combustion gas temperature controller 56 uses the corrected combustion gas temperature estimate value calculation unit 66 to calculate the corrected combustion gas temperature estimate value I3 based on the combustion gas temperature estimate value I2 and the correction term X4 (Step S26). Specifically, the combustion gas temperature controller 56 multiplies the combustion gas temperature estimate value I2 by the correction term X4 to calculate the corrected combustion gas temperature estimate value I3. The corrected combustion gas temperature estimate value I3 is a value obtained by correcting the combustion gas temperature estimate value I2 using the correction term X4.

After the corrected combustion gas temperature estimate value I3 is calculated, the combustion gas temperature controller 56 uses the combustion gas temperature determination unit 68 to determine whether the corrected combustion gas temperature estimate value I3 is higher than the temperature threshold $I_{th}$ (Step S28), and to transmit, if the corrected combustion gas temperature estimate value I3 is higher than the temperature threshold $I_{th}$ (Yes at Step S28), the output limiting signal to the gas turbine controller 58 (Step S30). If the output limiting signal is acquired, the gas turbine controller 58 selects the output limiting operation to reduce the output to a lower value than that of the normal operation, and determines the supply amount of the fuel F for performing the output limiting operation. If the corrected combustion gas temperature estimate value I3 is not higher than the temperature threshold $I_{th}$ (No at Step S28), that is, if the corrected combustion gas temperature estimate value I3 does not exceed the temperature threshold $I_{th}$, the combustion gas temperature determination unit 68 transmits the normal signal to the gas turbine controller 58 (Step S32). If the normal signal is acquired, the gas turbine controller 58 selects the normal operation according to the operating condition acquired from the governor controller 57, and determines the supply amount of the fuel F for performing the normal operation. After the processing at Step S30 or Step S32 is performed, the process advances to Step S34, and, if the control is not to be ended (No at Step S34), the process returns to Step S12. The combustion gas temperature estimate value I2 is calculated based on the detection values I1 acquired at the subsequent time, and the subsequent processing is repeated. If the control is to be ended (Yes at Step S34), the control is ended.

To prevent the temperature of the combustion gas I flowing into the turbine 13 from exceeding the predetermined upper limit value, the controller 50 performs the output limiting operation if the temperature excessively rises. Since the output limiting operation is an operation to limit the output to a value below that of the normal operation, the supply amount of the fuel F is restrained, and thus, the temperature of the combustion gas I can be restrained from rising. However, the combustion gas I has a high temperature and high pressure, and therefore, is difficult to be directly measured. Therefore, the controller 50 calculates the temperature of the combustion gas I as the estimate value. If the temperature estimate value of the combustion gas I is calculated from the temperature detection value of the flue gas O, the temperature estimate value of the combustion gas I has a relatively small error with respect to the actual temperature of the combustion gas I, and thus, is high in calculation accuracy. However, the temperature change of the flue gas O is greatly delayed in time with respect to the temperature change of the combustion gas I, and thus, is low in response. The estimate value of the temperature of the combustion gas calculated from the detection values I1, such as the supply amount of the fuel F and the pressure of the compressed air A1, is higher in response to the actual temperature change of the combustion gas I, but is lower in the calculation accuracy.

The controller 50 according to the first embodiment calculates the combustion gas temperature estimate value I2 representing the temperature estimate value of the combustion gas I calculated from the detection values I1. The combustion gas temperature estimate value I2 is a value highly responsive to the actual temperature change of the combustion gas I. In addition, the controller 50 calculates, as the flue gas temperature estimate value O3, the estimated temperature of the flue gas O when the temperature of the combustion gas I is assumed to be the combustion gas temperature estimate value I2. The controller 50 calculates the correction term X4 representing the ratio of the flue gas temperature detection value O1 to the flue gas temperature estimate value O3. The controller 50 multiplies the combustion gas temperature estimate value I2 by the correction term X4 to calculate the corrected combustion gas temperature estimate value I3 representing the temperature estimate value of the combustion gas I. Since the correction term X4 is the ratio of the flue gas temperature detection value O1 to the flue gas temperature estimate value O3, the multiplication of the combustion gas temperature estimate value I2 by the correction term X4 makes the corrected combustion gas temperature estimate value I3 a value having the high calculation accuracy in addition to the high response. The controller 50 makes the determination on the temperature of the combustion gas I based on the corrected combustion gas temperature estimate value I3 that is high in response and calculation accuracy. Accordingly, the controller 50 can accurately perform the temperature adjustment control.

As described above, the controller 50 (control device) according to the first embodiment is the control device for the gas turbine 1. The gas turbine 1 includes: the compressor 11 that compresses the air A supplied from the air supply line 20; the combustor 12 to which the fuel F is supplied and which burns the compressed air A1 compressed in the compressor 11; the turbine 13 that is rotated by the combustion gas I generated in the combustor 12; the flue gas discharge line 29 through which the flue gas O is discharged, the flue gas being the combustion gas I that has rotated the turbine 13; and the generator 17 that generates electric power by being rotated by the turbine 13. The controller 50 includes the detection value acquisition unit 52, the flue gas temperature acquisition unit 54, the combustion gas temperature estimate value calculation unit 60, the correction term acquisition unit 64, the corrected combustion gas temperature estimate value calculation unit 66, and the gas turbine controller 58. The detection value acquisition unit 52 acquires at least one of the detection values I1 of the supply amount of the fuel F, the pressure of the compressed air A1, and the electric power generated by the generator 17. The flue gas temperature acquisition unit 54 acquires the flue gas temperature detection value O1 representing the detection value of the temperature of the flue gas O. The combustion gas temperature estimate value calculation unit 60 calculates, based on the detection values I1, the combustion gas temperature estimate value I2 representing the estimated temperature of the combustion gas I. The correction term acquisition unit 64 calculates the correction term X4 based on the ratio between the combustion gas temperature estimate value I2 and the flue gas temperature detection value O1. The corrected combustion gas temperature estimate value calculation unit 66 corrects the combustion gas temperature estimate value I2 using the correction term X4 to calculate the corrected combustion gas temperature estimate value I3. The gas turbine controller 58 controls the gas turbine 1 based on the corrected combustion gas temperature estimate value I3.

The controller 50 calculates the corrected combustion gas temperature estimate value I3 by correcting the combustion gas temperature estimate value I2 that is highly responsive to the temperature change using the correction term X4 calculated based on the flue gas temperature detection value O1 that is high in calculation accuracy. Accordingly, the corrected combustion gas temperature estimate value I3 is high in response and calculation accuracy. Accordingly, the controller 50 can calculate the temperature estimate value of the combustion gas I (corrected combustion gas temperature estimate value I3) that is high in response and also high in calculation accuracy. Since the controller 50 uses the corrected combustion gas temperature estimate value I3 to control the supply amount of the fuel F, the accuracy of the temperature adjustment control can be improved. In the present embodiment, the gas turbine controller 58 controls the supply amount of the fuel F (performs the temperature adjustment control) based on the corrected combustion gas temperature estimate value I3. However, the target of the control is not limited to the supply amount of the fuel F, as long as the gas turbine 1 is controlled based on the corrected combustion gas temperature estimate value I3. The gas turbine controller 58 may control, for example, the intake amount of the air A. The gas turbine controller 58 may also perform, for example, fuel distribution control of controlling the distribution of the fuel to each fuel system based on the corrected combustion gas temperature estimate value I3.

The flue gas temperature detection value O1 in the present embodiment is the temperature of the flue gas O detected by the flue gas thermometer 38, but may be the temperature of the flue gas O detected by the blade path thermometer 37. In other words, the flue gas temperature detection value O1 may be a detection value in any position of the flue gas discharge line 29, as long as being the detection value of the temperature of the flue gas O. Since the blade path thermometer 37 detects the temperature of the flue gas O immediately after passing through the turbine 13, the temperature of the flue gas O detected by the blade path thermometer 37 is higher in calculation accuracy than the combustion gas temperature estimate value I2 although lower in calculation accuracy than the temperature of the flue gas O detected by the flue gas thermometer 38. In addition, the temperature of the flue gas O detected by the blade path thermometer 37 is higher in response than the temperature of the flue gas O detected by the flue gas thermometer 38 at the rear side stage of the blade path thermometer 37. Accordingly, by using the temperature of the flue gas O detected by the blade path thermometer 37 as the flue gas temperature detection value O1, the controller 50 can calculate the corrected combustion gas temperature estimate value I3 that is high in calculation accuracy and is also higher in response.

The controller 50 further includes the flue gas temperature estimate value acquisition unit 62 that calculates the flue gas temperature estimate value O3 representing the estimated temperature of the flue gas O based on the combustion gas temperature estimate value I2. The correction term acquisition unit 64 calculates the correction term X4 based on the ratio between the flue gas temperature estimate value O3 and the flue gas temperature detection value O1. The controller 50 converts the combustion gas temperature estimate value I2 into the flue gas temperature estimate value O3, and calculates the correction term X4 based on the ratio between the converted flue gas temperature estimate value O3 and the flue gas temperature detection value O1. The controller 50 calculates the correction term X4 based on the temperatures of the flue gas O, and therefore, can accurately calculate the correction term X4.

The correction term acquisition unit 64 calculates, as the correction term X4, the ratio of the flue gas temperature detection value O1 to the flue gas temperature estimate value O3. The corrected combustion gas temperature estimate value calculation unit 66 multiplies the combustion gas temperature estimate value I2 by the correction term X4 to calculate the corrected combustion gas temperature estimate value I3. By calculating the correction term X4 and the corrected combustion gas temperature estimate value I3 in this manner, the controller 50 can further improve the calculation accuracy of the corrected combustion gas temperature estimate value I3.

The correction term acquisition unit 64 includes the ratio calculation unit 80, the adjustment coefficient setting unit 81, the adjustment ratio calculation unit 82, the past adjustment ratio calculation unit 84, and the correction term calculation unit 86. The ratio calculation unit 80 calculates the ratio X1 of the flue gas temperature detection value O1 to the flue gas temperature estimate value O3. The adjustment coefficient setting unit 81 sets the adjustment coefficient α for the ratio X1 to a value larger than 0 and equal to or smaller than 1. The adjustment ratio calculation unit 82 multiplies the ratio X1 by the adjustment coefficient α to calculate the adjustment ratio X2. The past adjustment ratio calculation unit 84 multiplies the previously calculated correction term X4 (past correction term X4') by the value (1−α) obtained by subtracting the adjustment coefficient α from 1 to calculate the past adjustment ratio X3. The correction term calculation unit 86 adds the past adjustment ratio X3 to the adjustment ratio X2 to calculate the correction term X4. By calculating the correction term X4 using the adjustment ratio X2 and the past adjustment ratio X3, the correction term acquisition unit 64 calculates the correction term X4 using not only the current value but also the past value. If, for example, an unusual temperature change, such as noise, occurs and the temperature change soon returns to normal, the level of contribution of the temperature change to the corrected combustion gas temperature estimate value I3 can be reduced by using also the past value. In this manner, by calculating the correction term X4 using the past value, the calculation accuracy of the corrected combustion gas temperature estimate value I3 can be further improved.

However, the correction term acquisition unit 64 may not use the past value, in other words, may not use the past adjustment ratio X3 to calculate the correction term X4. In this case, the ratio X1 may be used as the correction term X4, or the adjustment ratio X2 may be used as the correction term X4.

Although the adjustment coefficient setting unit 81 sets the adjustment coefficient α as a constant value, the adjustment coefficient α may be changed after each lapse of time. For example, the adjustment coefficient setting unit 81 may set the adjustment coefficient α based on the amount of change in the combustion gas temperature estimate value I2 during a predetermined time. In this case, for example, the adjustment coefficient setting unit 81 sets the value of the adjustment coefficient α to a smaller value as the amount of change in the combustion gas temperature estimate value I2 during the predetermined time decreases, and sets the value of the adjustment coefficient α to a larger value as the amount of change in the combustion gas temperature estimate value I2 during the predetermined time increases. If the amount of change in the combustion gas temperature estimate value I2 is small, the temperature of the combustion gas I can be said to be stable. If the temperature of the combustion gas I is stable, the accuracy of the combustion gas temperature estimate value I2 is restrained from decreasing. If the amount of change in the combustion gas temperature estimate value I2 is small and the temperature is stable, the adjustment coefficient setting unit 81 can increase the response to the temperature change of the combustion gas I by reducing the value of the adjustment coefficient α to increase the level of contribution of the combustion gas temperature estimate value I2 to the corrected combustion gas temperature estimate value. If the amount of change in the combustion gas temperature estimate value I2 is large and the temperature is not stable, the adjustment coefficient setting unit 81 can increase the accuracy with respect to the temperature change of the combustion gas I by increasing the value of the adjustment coefficient α to increase the level of contribution of the flue gas temperature detection value O1 to the corrected combustion gas temperature estimate value.

The flue gas temperature estimate value acquisition unit 62 includes the temporary flue gas temperature estimate value acquisition unit 70 and the flue gas temperature estimate value calculation unit 74. The temporary flue gas temperature estimate value acquisition unit 70 enters the combustion gas temperature estimate value I2 into the predetermined calculation expression defined in advance to calculate the temporary flue gas temperature estimate value O2. The flue gas temperature estimate value calculation unit 74 calculates the flue gas temperature estimate value O3 by performing the first-order lag processing of delaying the change with time of the value of the temporary flue gas temperature estimate value O2. The flue gas temperature estimate value acquisition unit 62 can calculates the flue gas temperature estimate value O3 by performing the first-order lag processing, and therefore, can calculate the flue gas temperature estimate value O3 reflecting the relation of the first-order lag by which the temperature change of the flue gas O is delayed with respect to the temperature change of the combustion gas I. Consequently, the flue gas temperature estimate value acquisition unit 62 can more accurately calculate the correction term X4.

Second Embodiment

The following describes a second embodiment of the present invention. A controller 50a according to the second embodiment differs from the controller of the first embodiment in that a corrected upstream flue gas temperature detection value is used to calculate the correction term. In the second embodiment, description will not be given of parts having common configurations with those in the first embodiment.

Figure 6:
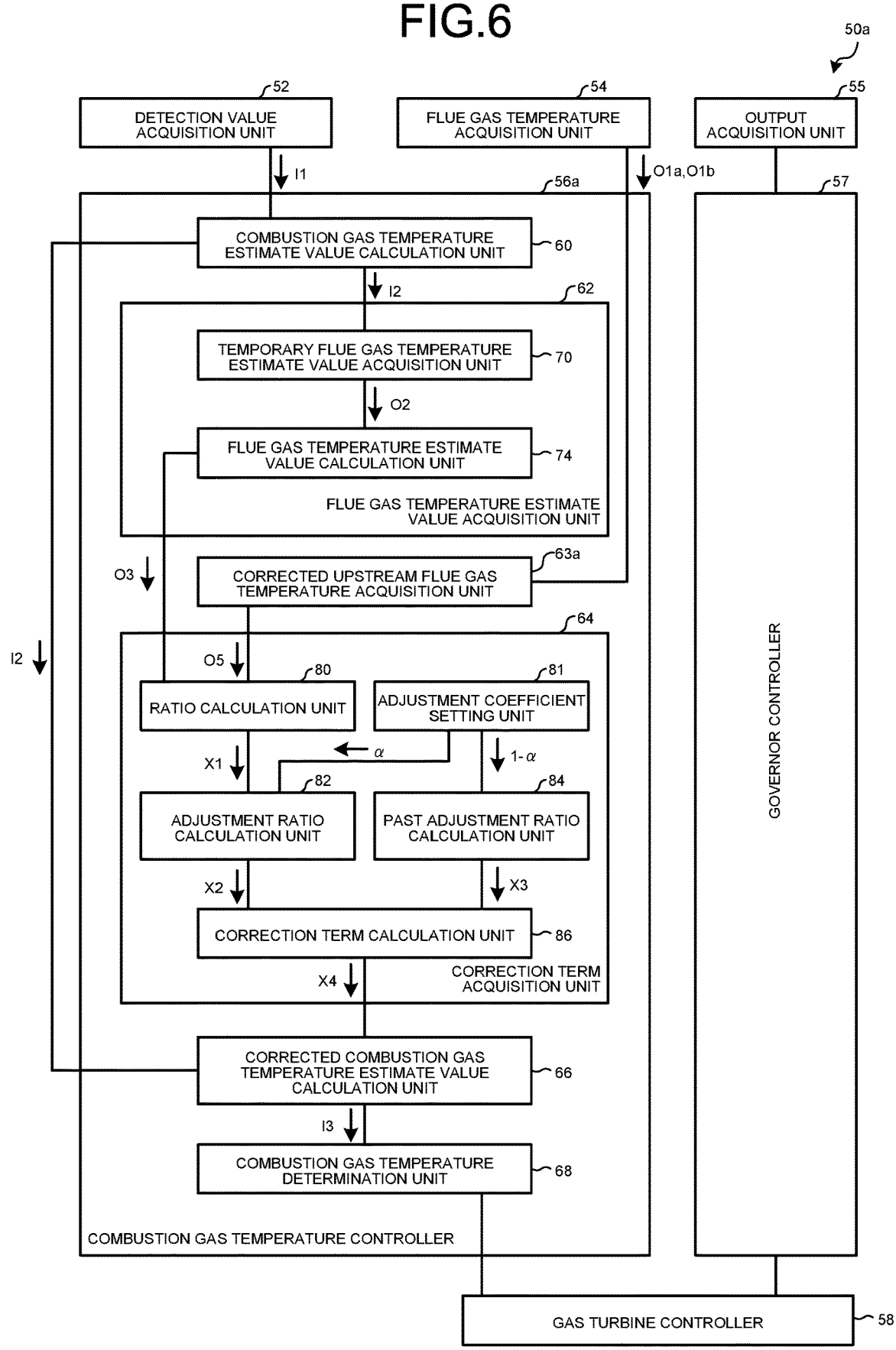
FIG. 6 is a block diagram of a controller according to a second embodiment of the present invention.
Figure 7:
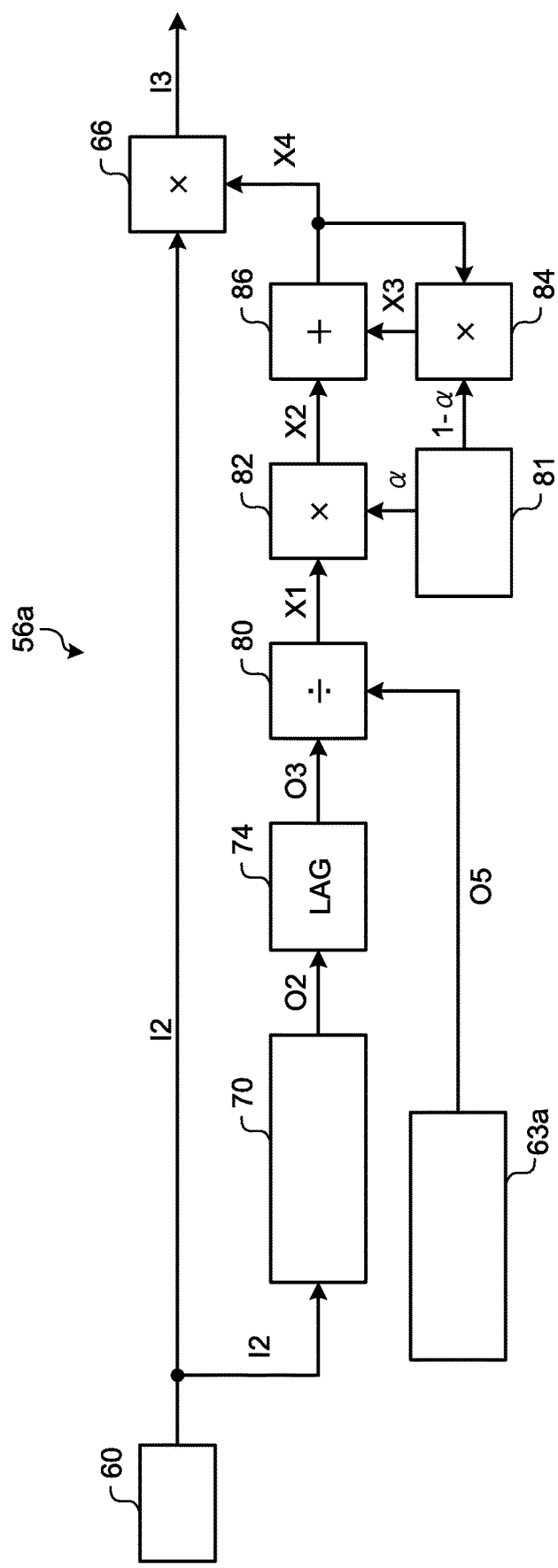
FIG. 7 is a pseudo-circuit diagram of a combustion gas temperature controller according to the second embodiment.

FIG. 6 is a block diagram of the controller according to the second embodiment. FIG. 7 is a pseudo-circuit diagram of a combustion gas temperature controller according to the second embodiment. As illustrated in FIG. 6, a combustion gas temperature controller 56a according to the second embodiment includes a corrected upstream flue gas temperature acquisition unit 63a. The corrected upstream flue gas temperature acquisition unit 63a acquires an upstream flue gas temperature detection value O1a and a downstream flue gas temperature detection value O1b from the flue gas temperature acquisition unit 54. The upstream flue gas temperature detection value O1a is a detection value of the temperature of the flue gas O at the immediate rear of the turbine 13. In other words, the upstream flue gas temperature detection value O1a is the temperature of the flue gas O detected by the blade path thermometer 37. The downstream flue gas temperature detection value O1b is a detection value of the temperature of the flue gas O on a downstream side in the flue gas O of the place where the upstream flue gas temperature detection value O1a is detected. In other words, the downstream flue gas temperature detection value O1b is the temperature of the flue gas O detected by the flue gas thermometer 38. Hereinafter, the flue gas O in the position of the blade path thermometer 37 is referred to as an upstream flue gas Oa, and the flue gas O in the position of the flue gas thermometer 38 is referred to as a downstream flue gas Ob.

The corrected upstream flue gas temperature acquisition unit 63a calculates a corrected upstream flue gas temperature detection value O5 based on the upstream flue gas temperature detection value O1a and the downstream flue gas temperature detection value O1b. As illustrated in FIGS. 6 and 7, the ratio calculation unit 80 according to the second embodiment calculates the ratio X1 based on the combustion gas temperature estimate value I2 and the corrected upstream flue gas temperature detection value O5. That is, the ratio calculation unit 80 according to the second embodiment differs from that of the first embodiment in that the corrected upstream flue gas temperature detection value O5 is used as the flue gas temperature detection value O1 to calculate the ratio X1. The other control of the combustion gas temperature controller 56a is the same as that of the combustion gas temperature controller 56 according to the first embodiment.

Figure 8:
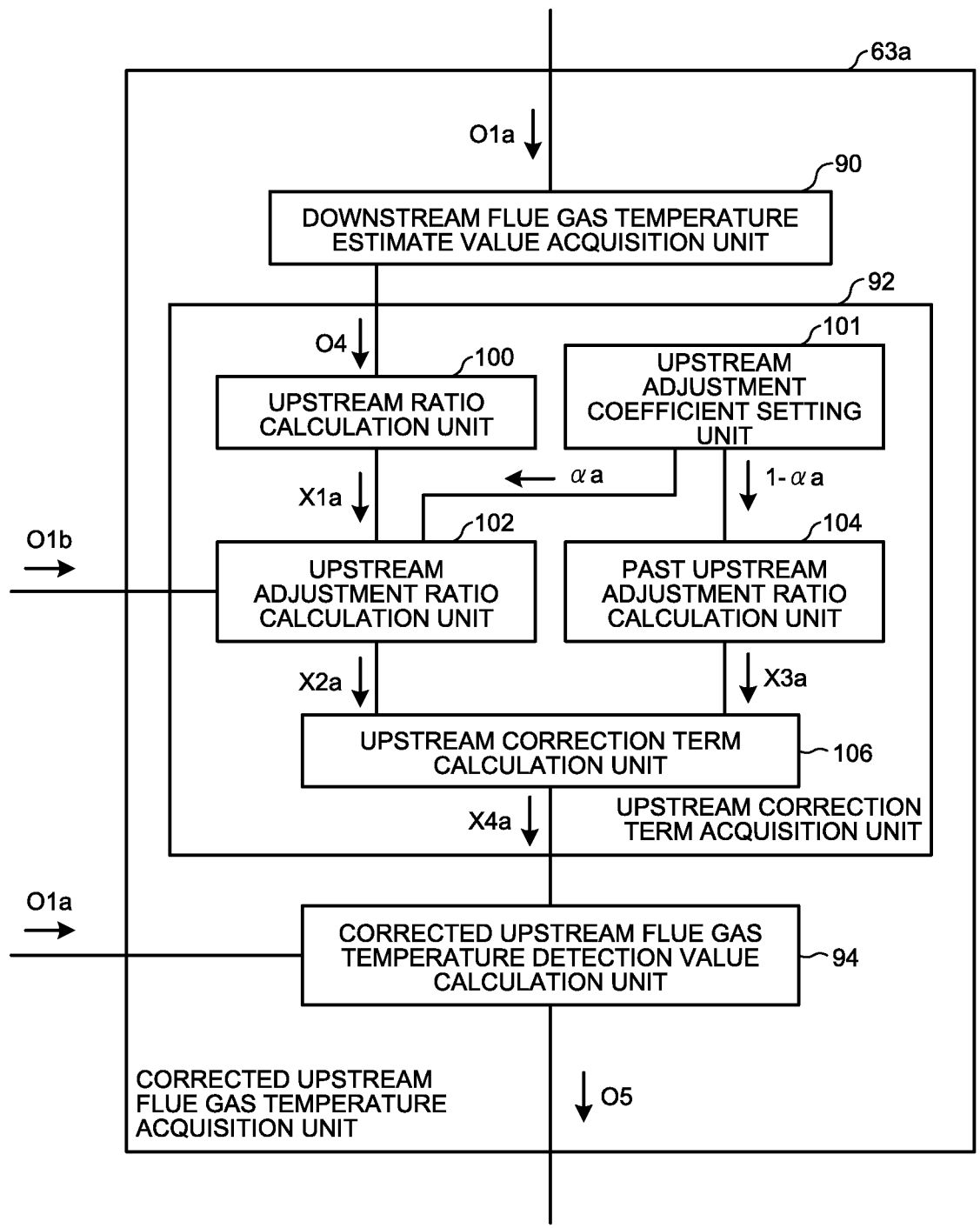
FIG. 8 is a block diagram of a corrected upstream flue gas temperature acquisition unit according to the second embodiment.
Figure 9:
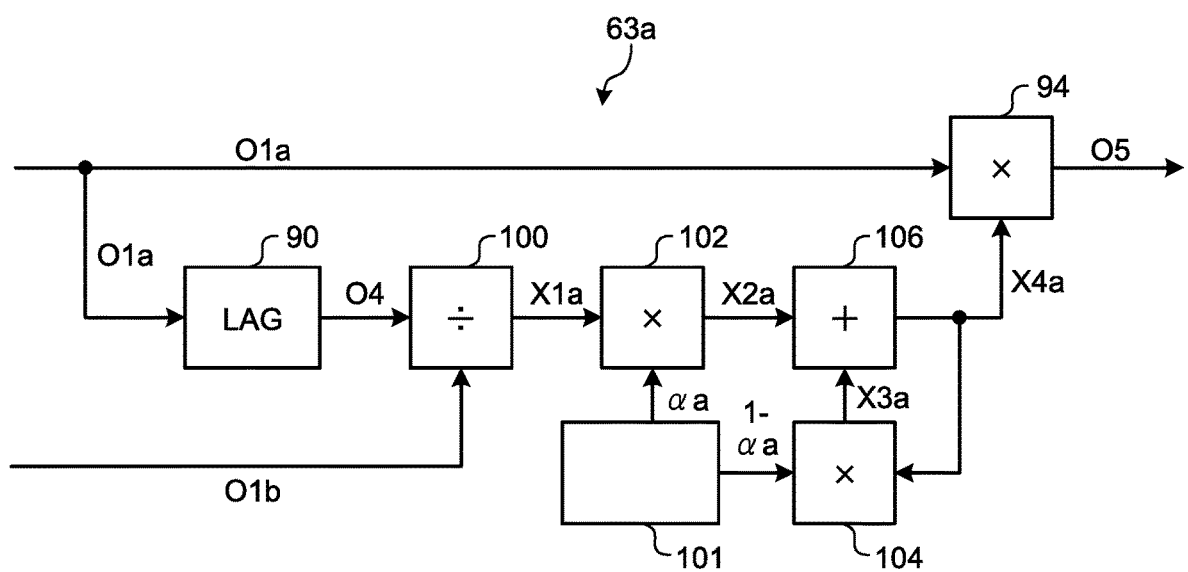
FIG. 9 is a pseudo-circuit diagram of the corrected upstream flue gas temperature acquisition unit according to the second embodiment.

The following describes the corrected upstream flue gas temperature acquisition unit 63a in detail. FIG. 8 is a block diagram of the corrected upstream flue gas temperature acquisition unit according to the second embodiment. FIG. 9 is a pseudo-circuit diagram of the corrected upstream flue gas temperature acquisition unit according to the second embodiment. As illustrated in FIG. 8, the corrected upstream flue gas temperature acquisition unit 63a includes a downstream flue gas temperature estimate value acquisition unit 90, an upstream correction term acquisition unit 92, and a corrected upstream flue gas temperature detection value calculation unit 94.

The downstream flue gas temperature estimate value acquisition unit 90 calculates a downstream flue gas temperature estimate value O4 based on the upstream flue gas temperature detection value O1a. The downstream flue gas temperature estimate value O4 is an estimate value of the temperature of the downstream flue gas Ob. The downstream flue gas temperature estimate value acquisition unit 90 calculates the downstream flue gas temperature estimate value O4 by performing the first-order lag processing of delaying the change with time of the value of the upstream flue gas temperature detection value O1a. Specifically, the downstream flue gas temperature estimate value acquisition unit 90 stores therein a temperature relational expression representing a relation in time between the temperature of the upstream flue gas Oa and the temperature of the downstream flue gas Ob. This temperature relational expression is a relational expression of a first-order lag system in which the temperature change of the downstream flue gas Ob lags behind the temperature change of the upstream flue gas Oa. The downstream flue gas Ob is located downstream with respect to the upstream flue gas Oa, and therefore, lags behind the upstream flue gas Oa in temperature change. In other words, the temperature of the downstream flue gas Ob has a relation of the first-order lag with the temperature of the upstream flue gas Oa. The downstream flue gas temperature estimate value acquisition unit 90 enters the upstream flue gas temperature detection value O1a into the temperature relational expression to perform the first-order lag processing, and thus, calculates the downstream flue gas temperature estimate value O4. In other words, the downstream flue gas temperature estimate value O4 is a value obtained by applying the first-order lag processing to the upstream flue gas temperature detection value O1a.

The upstream correction term acquisition unit 92 calculates, based on the ratio between the upstream flue gas temperature detection value O1a and the downstream flue gas temperature detection value O1b, an upstream correction term X4a for correcting the upstream flue gas temperature detection value O1a. In the present embodiment, the upstream correction term acquisition unit 92 calculates the upstream correction term X4a based on the ratio between the downstream flue gas temperature detection value O1b and the downstream flue gas temperature estimate value O4 that has been calculated based on the upstream flue gas temperature detection value O1a. Specifically, as illustrated in FIG. 8, the upstream correction term acquisition unit 92 includes an upstream ratio calculation unit 100, an upstream adjustment coefficient setting unit 101, an upstream adjustment ratio calculation unit 102, a past upstream adjustment ratio calculation unit 104, and an upstream correction term calculation unit 106.

The upstream ratio calculation unit 100 calculates an upstream ratio X1a representing the ratio of the downstream flue gas temperature detection value O1b to the downstream flue gas temperature estimate value O4. In other words, as illustrated in FIG. 9, the upstream ratio calculation unit 100 divides the downstream flue gas temperature detection value O1b by the downstream flue gas temperature estimate value O4 to calculate the upstream ratio X1a, as given by Expression (8) below.

$$X1a = O1b/O4 \tag{8}$$

The upstream adjustment coefficient setting unit 101 sets an adjustment coefficient αa for the upstream ratio to a value larger than 0 and equal to or smaller than 1. The upstream adjustment coefficient setting unit 101 sets a predetermined value larger than 0 and equal to or smaller than 1 as the adjustment coefficient αa, for example, through the setting by the operator. The adjustment coefficient αa may be the adjustment coefficient α of the first embodiment, or may be set to another value. As illustrated in FIG. 9, the upstream adjustment ratio calculation unit 102 multiplies the upstream ratio X1a by the adjustment coefficient αa to calculate an upstream adjustment ratio X2a, as given by Expression (9) below.

$$X2a = \alpha a \cdot X1a \tag{9}$$

The past upstream adjustment ratio calculation unit 104 stores therein a past upstream correction term X4a' that is the previously calculated upstream correction term X4a. The past upstream adjustment ratio calculation unit 104 multiplies the past upstream correction term X4a' by a value obtained by subtracting the adjustment coefficient αa from 1, that is, 1−αa to calculate a past upstream adjustment ratio X3a, as given by Expression (10) below.

$$X3a = (1-\alpha a) \cdot X4a' \quad (10)$$

The upstream correction term calculation unit 106 calculates the upstream correction term X4a based on the upstream adjustment ratio X2a. Specifically, as illustrated in FIG. 9, the upstream correction term calculation unit 106 adds the past upstream adjustment ratio X3a to the upstream adjustment ratio X2a to calculate the upstream correction term X4a, as given by Expression (11) below.

$$X4a = X2a + X3a \quad (11)$$

The upstream correction term X4a thus calculated is a value based on the ratio between the upstream flue gas temperature detection value O1a and the downstream flue gas temperature detection value O1b, and can be said to be a correction term for correcting the upstream flue gas temperature detection value O1a using the downstream flue gas temperature detection value O1b.

The corrected upstream flue gas temperature detection value calculation unit 94 corrects the upstream flue gas temperature detection value O1a using the upstream correction term X4a to calculate the corrected upstream flue gas temperature detection value O5. Specifically, as illustrated in FIG. 9, the corrected upstream flue gas temperature detection value calculation unit 94 multiplies the upstream flue gas temperature detection value O1a by the upstream correction term X4a to calculate the corrected upstream flue gas temperature detection value O5, as given by Expression (12) below.

$$O5 = X4a \cdot O1a \quad (12)$$

The ratio calculation unit 80 according to the second embodiment calculates the ratio X1 based on the combustion gas temperature estimate value I2 and the corrected upstream flue gas temperature detection value O5. The subsequent processing is the same as that of the first embodiment.

The controller 50a according to the second embodiment uses the corrected upstream flue gas temperature detection value O5 instead of the flue gas temperature detection value O1 to calculate the corrected combustion gas temperature estimate value I3. The upstream flue gas temperature detection value O1a detected by the blade path thermometer 37 is lower in calculation accuracy than the downstream flue gas temperature detection value O1b detected by the flue gas thermometer 38. However, the upstream flue gas temperature detection value O1a is higher in response than the downstream flue gas temperature detection value O1b. The corrected upstream flue gas temperature detection value O5 is calculated by correcting the upstream flue gas temperature detection value O1a using the downstream flue gas temperature detection value O1b, that is, the upstream correction term X4a. Accordingly, the corrected upstream flue gas temperature detection value O5 can be said to be a value that is high in response and also high in calculation accuracy. The controller 50a according to the second embodiment uses the combustion gas temperature estimate value I2 and the corrected upstream flue gas temperature detection value O5 to calculate the corrected combustion gas temperature estimate value I3. Accordingly, the controller 50a according to the second embodiment can more appropriately improve the response and the calculation accuracy of the corrected combustion gas temperature estimate value I3.

As described above, in the controller 50a according to the second embodiment, the flue gas temperature acquisition unit 54 acquires the upstream flue gas temperature detection value O1a and the downstream flue gas temperature detection value O1b. The controller 50a includes the downstream flue gas temperature estimate value acquisition unit 90, the upstream correction term acquisition unit 92, and the corrected upstream flue gas temperature detection value calculation unit 94. The downstream flue gas temperature estimate value acquisition unit 90 acquires the downstream flue gas temperature estimate value O4 representing the estimate value of the temperature of the downstream flue gas Ob based on the upstream flue gas temperature detection value O1a. The upstream correction term acquisition unit 92 calculates, based on the ratio between the downstream flue gas temperature estimate value O4 and the downstream flue gas temperature detection value O1b, the upstream correction term X4a for correcting the upstream flue gas temperature detection value O1a. The corrected upstream flue gas temperature detection value calculation unit 94 corrects the upstream flue gas temperature detection value O1a using the upstream correction term X4a to calculate the corrected upstream flue gas temperature detection value O5. The correction term acquisition unit 64 uses the corrected upstream flue gas temperature detection value O5 as the flue gas temperature detection value O1 to calculate the correction term X4. The controller 50a calculates the correction term X4 using, as the flue gas temperature detection value O1, the corrected upstream flue gas temperature detection value O5 that has been corrected using the upstream correction term X4a. By using this correction term X4 to calculate the corrected combustion gas temperature estimate value I3, the controller 50a can more appropriately improve the response and the calculation accuracy of the corrected combustion gas temperature estimate value I3.

Third Embodiment

The following describes a third embodiment of the present invention. A controller 50b according to the third embodiment differs from the controller of the first embodiment in that a combustion gas temperature comparison value I2b is used to calculate the correction term X4. In the third embodiment, description will not be given of parts having common configurations with those in the first embodiment.

Figure 10:
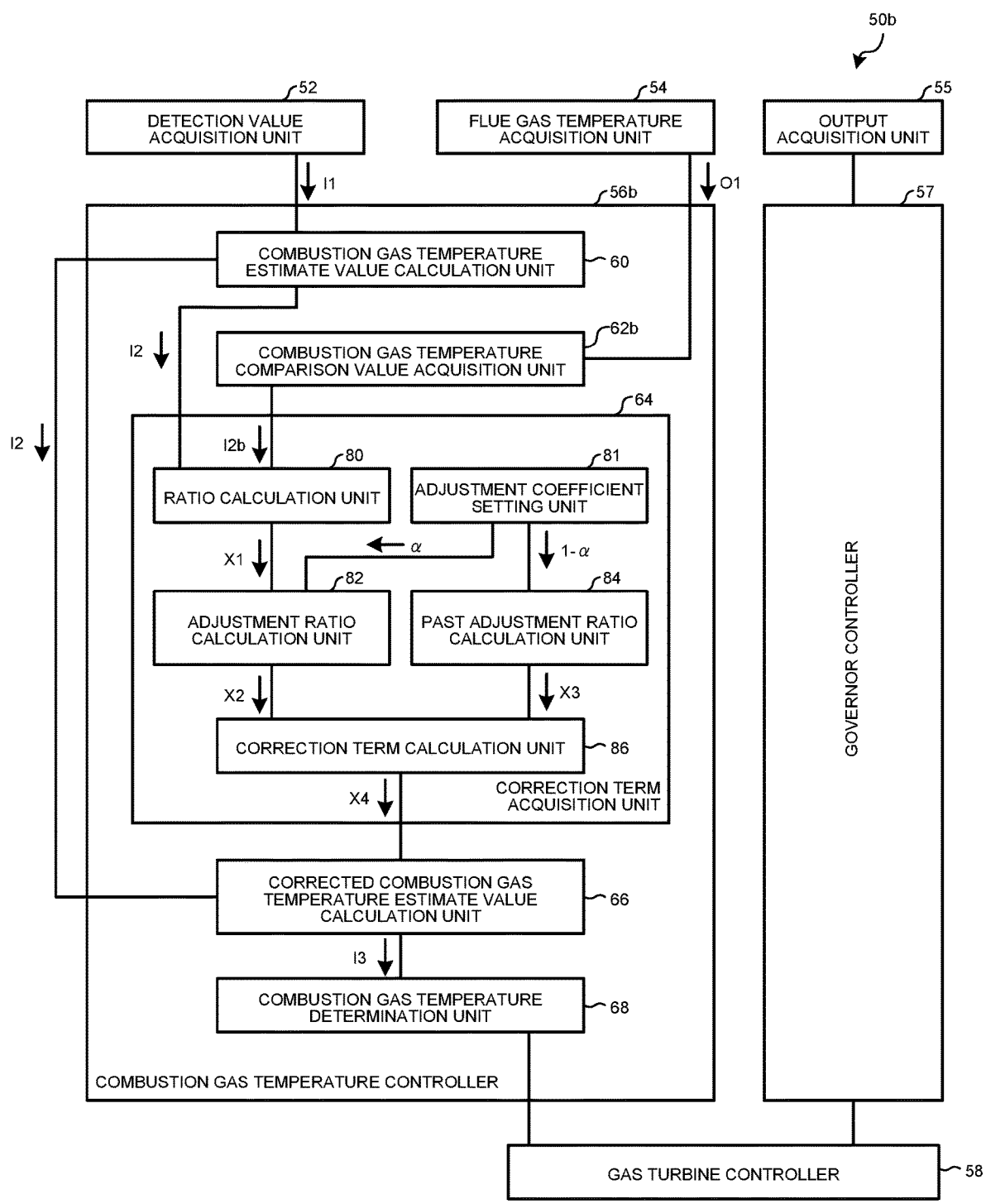
FIG. 10 is a block diagram of a controller according to a third embodiment of the present invention.

FIG. 10 is a block diagram of the controller according to the third embodiment. As illustrated in FIG. 10, a combustion gas temperature controller 56b according to the third embodiment does not include the flue gas temperature estimate value acquisition unit 62 of the first embodiment, but instead, includes a combustion gas temperature comparison value acquisition unit 62b. The combustion gas temperature comparison value acquisition unit 62b performs a heat balance calculation using the flue gas temperature detection value O1 to calculate the combustion gas temperature comparison value I2b. The combustion gas temperature estimate value I2 is the temperature estimate value of the combustion gas I calculated using the detection values I1, whereas the combustion gas temperature comparison value I2b is the estimate value of the temperature of the combustion gas I calculated using the flue gas temperature detection value O1. The combustion gas temperature comparison value I2b is a value calculated using the flue gas temperature detection value O1, and therefore, is higher in calculation accuracy than the combustion gas temperature estimate value I2.

The ratio calculation unit 80 in the third embodiment uses the combustion gas temperature estimate value I2 and the combustion gas temperature comparison value I2b to calculate the ratio X1. That is, the correction term acquisition unit 64 according to the third embodiment calculates the correction term X4 based on the ratio between the combustion gas temperature estimate value I2 and the combustion gas temperature comparison value I2b. The correction term acquisition unit 64 according to the third embodiment calculates the correction term X4 using the same method as that of the first embodiment except that the combustion gas temperature comparison value I2b is used instead of the flue gas temperature detection value O1.

In this manner, the controller 50b according to the third embodiment includes the combustion gas temperature comparison value acquisition unit 62b that performs the heat balance calculation using the flue gas temperature detection value O1 to calculate the combustion gas temperature comparison value I2b. The correction term acquisition unit 64 according to the third embodiment calculates the correction term X4 based on the ratio between the combustion gas temperature estimate value I2 and the combustion gas temperature comparison value I2b. The controller 50b according to the third embodiment calculates the corrected combustion gas temperature estimate value I3 using the correction term X4 that has been calculated using the combustion gas temperature comparison value I2b that is high in calculation accuracy. Accordingly, the controller 50b according to the third embodiment can calculate the corrected combustion gas temperature estimate value I3 that is high in calculation accuracy and higher in response.

While embodiments of the present invention have been described above, embodiments are not intended to be limited by the specifics of these embodiments. The components described above include those easily conceivable by those skilled in the art, those substantially identical, and equivalents. Furthermore, the components described above can be combined as appropriate. The components can be omitted, replaced, or modified in various way without departing from the spirit of the embodiments described above.

REFERENCE SIGNS LIST

1 Gas turbine
11 Compressor
12 Combustor
13 Turbine
15 Rotor
17 Generator
20 Air supply line
22 Inlet guide vanes
23 Opening adjuster
24 Compressed air conducting line
26 Fuel supply line
27 Fuel supply valve
28 Combustion gas supply line
29 Flue gas discharge line
32 Intake air detector
34 Casing detector
36 Fuel detector
37 Blade path thermometer
38 Flue gas thermometer
39 Output meter
50, 50a, 50b Controller
52 Detection value acquisition unit
54 Flue gas temperature acquisition unit
55 Output acquisition unit
56, 56a, 56b Combustion gas temperature controller
57 Governor controller
58 Gas turbine controller
60 Combustion gas temperature estimate value calculation unit
62 Flue gas temperature estimate value acquisition unit
62b Combustion gas temperature comparison value acquisition unit
63a Corrected upstream flue gas temperature acquisition unit
64 Correction term acquisition unit
66 Corrected combustion gas temperature estimate value calculation unit
68 Combustion gas temperature determination unit
70 Temporary flue gas temperature estimate value acquisition unit
74 Flue gas temperature estimate value calculation unit
80 Ratio calculation unit
81 Adjustment coefficient setting unit
82 Adjustment ratio calculation unit
84 Past adjustment ratio calculation unit
86 Correction term calculation unit
90 Downstream flue gas temperature estimate value acquisition unit
92 Upstream correction term acquisition unit
94 Corrected upstream flue gas temperature detection value calculation unit
100 Upstream ratio calculation unit
101 Upstream adjustment coefficient setting unit
102 Upstream adjustment ratio calculation unit
104 Past upstream adjustment ratio calculation unit
106 Upstream correction term calculation unit
A Air
A1 Compressed air
F Fuel
I Combustion gas
I1 Detection value
I2 Combustion gas temperature estimate value
I2b Combustion gas temperature comparison value
I3 Corrected combustion gas temperature estimate value
$I_{th}$ Temperature threshold
O Flue gas
O1 Flue gas temperature detection value
O1a Upstream flue gas temperature detection value
O1b Downstream flue gas temperature detection value
O2 Temporary flue gas temperature estimate value
O3 Flue gas temperature estimate value
O4 Downstream flue gas temperature estimate value
O5 Corrected upstream flue gas temperature detection value
Oa Upstream flue gas
Ob Downstream flue gas
X1 Ratio
X1a Upstream ratio
X2 Adjustment ratio
X2a Upstream adjustment ratio
X3 Past adjustment ratio
X3a Past upstream adjustment ratio
X4' Past correction term
X4 Correction term
X4a' Past upstream correction term
X4a Upstream correction term
α, αa Adjustment coefficient

The invention claimed is:

1. A control device for a gas turbine,
the gas turbine including:
a compressor configured to compress air supplied from an air supply line;
a combustor configured to receive fuel and burn compressed air compressed by the compressor;
a turbine configured to be rotated by a combustion gas generated in the combustor;
a flue gas discharge line configured to discharge flue gas, the flue gas being the combustion gas that has rotated the turbine; and
a generator configured to generate electric power by being rotated by the turbine,
the control device comprising:
a processor; and
a non-transitory computer-readable medium having stored thereon executable instructions that, when executed by the processor, cause the control device to function as:
a detection value acquisition unit configured to acquire a detection value of at least one of a supply amount of the fuel, pressure of the compressed air, and the electric power generated by the generator;
a flue gas temperature acquisition unit configured to acquire a flue gas temperature detection value representing a detection value of a temperature of the flue gas;
a combustion gas temperature estimate value calculation unit configured to calculate, based on the detection value acquired by the detection value acquisition unit, a combustion gas temperature estimate value representing an estimated temperature of the combustion gas;
a correction term acquisition unit configured to calculate a correction term for correcting the combustion gas temperature estimate value based on a ratio between the combustion gas temperature estimate value and the flue gas temperature detection value;
a corrected combustion gas temperature estimate value calculation unit configured to correct the combustion gas temperature estimate value using the correction term to calculate a corrected combustion gas temperature estimate value; and
a gas turbine controller configured to control the gas turbine based on the corrected combustion gas temperature estimate value.

2. The control device for the gas turbine according to claim 1, wherein the executable instructions, when executed by the processor, cause the control device to further function as a flue gas temperature estimate value acquisition unit configured to calculate a flue gas temperature estimate value representing an estimated temperature of the flue gas based on the combustion gas temperature estimate value, and
wherein the correction term acquisition unit is configured to calculate the correction term based on a ratio between the flue gas temperature estimate value and the flue gas temperature detection value.

3. The control device for the gas turbine according to claim 2, wherein the correction term acquisition unit is configured to calculate, as the correction term, the ratio between the flue gas temperature estimate value and the flue gas temperature detection value, and
wherein the corrected combustion gas temperature estimate value calculation unit is configured to multiply the combustion gas temperature estimate value by the correction term to calculate the corrected combustion gas temperature estimate value.

4. The control device for the gas turbine according to claim 3, wherein the correction term acquisition unit comprises:
a ratio calculation unit configured to calculate the ratio between the flue gas temperature estimate value and the flue gas temperature detection value;
an adjustment coefficient setting unit configured to set an adjustment coefficient for the ratio between the flue gas temperature estimate value and the flue gas temperature detection value to a value larger than 0 and equal to or smaller than 1;
an adjustment ratio calculation unit configured to multiply the ratio between the flue gas temperature estimate value and the flue gas temperature detection value by the adjustment coefficient to calculate an adjustment ratio;
a past adjustment ratio calculation unit configured to multiply a previously calculated correction term by a value obtained by subtracting the adjustment coefficient from 1 to calculate a past adjustment ratio; and
a correction term calculation unit configured to add the past adjustment ratio to the adjustment ratio to calculate the correction term.

5. The control device for the gas turbine according to claim 2, wherein the flue gas temperature estimate value acquisition unit comprises:
a temporary flue gas temperature estimate value acquisition unit configured to enter the combustion gas temperature estimate value into a predetermined calculation expression defined in advance to calculate a temporary flue gas temperature estimate value; and
a flue gas temperature estimate value calculation unit configured to calculate the flue gas temperature estimate value by performing first-order lag processing of delaying a change with time of a value of the temporary flue gas temperature estimate value.

6. The control device for the gas turbine according to claim 1, wherein the flue gas temperature acquisition unit is configured to acquire an upstream flue gas temperature detection value and a downstream flue gas temperature detection value, the upstream flue gas temperature detection value representing a temperature of the flue gas at an immediate rear of the turbine, the downstream flue gas temperature detection value representing a temperature of the flue gas on a downstream side of a place where the upstream flue gas temperature detection value is detected,
wherein the executable instructions, when executed by the processor, cause the control device to further function as:
a downstream flue gas temperature estimate value acquisition unit configured to acquire a downstream flue gas temperature estimate value representing an estimate value of the temperature of the flue gas on the downstream side based on the upstream flue gas temperature detection value;
an upstream correction term acquisition unit configured to calculate, based on a ratio between the downstream flue gas temperature detection value and the downstream flue gas temperature estimate value, an upstream correction term for correcting the upstream flue gas temperature detection value; and
a corrected upstream flue gas temperature detection value calculation unit configured to correct the upstream flue gas temperature detection value using the upstream correction term to calculate a corrected upstream flue gas temperature detection value, and wherein the correction term acquisition unit is configured to use the corrected upstream flue gas temperature detection value as the flue gas temperature detection value to calculate the correction term.

7. The control device for the gas turbine according to claim 1, wherein the executable instructions, when executed by the processor, cause the control device to further function as a combustion gas temperature comparison value acquisition unit configured to perform a heat balance calculation using the flue gas temperature detection value to calculate a combustion gas temperature comparison value representing the estimated temperature of the flue-combustion gas, and wherein the correction term acquisition unit is configured to calculate the correction term based on a ratio between the combustion gas temperature estimate value and the combustion gas temperature comparison value.

8. A control method for a gas turbine, the gas turbine including:

a compressor that compresses air supplied from an air supply line;

a combustor to which fuel is supplied and that burns compressed air compressed by the compressor;

a turbine that is rotated by a combustion gas generated in the combustor;

a flue gas discharge line through which flue gas is discharged, the flue gas being the combustion gas that has rotated the turbine; and a generator that generates electric power by being rotated by the turbine, the control method comprising:

acquiring a detection value of at least one of a supply amount of the fuel, pressure of the compressed air, and the electric power generated by the generator;

acquiring a flue gas temperature detection value representing a detection value of a temperature of the flue gas;

calculating, based on the detection value acquired, a combustion gas temperature estimate value representing an estimated temperature of the combustion gas;

calculating a correction term for correcting the combustion gas temperature estimate value based on a ratio between the combustion gas temperature estimate value and the flue gas temperature detection value;

correcting the combustion gas temperature estimate value using the correction term to calculate a corrected combustion gas temperature estimate value; and controlling the gas turbine based on the corrected combustion gas temperature estimate value.

* * * * *